US007072800B1

(12) United States Patent
Fernandez et al.

(10) Patent No.: US 7,072,800 B1
(45) Date of Patent: Jul. 4, 2006

(54) APPLICATION RESPONSE MONITOR

(75) Inventors: Gary Fernandez, Concord, MA (US); Ken Kane, Acton, MA (US); Pierre Perret, Glendale, AZ (US); Krishnan Seetharaman, Shrewsbury, MA (US); Mark Sylor, Nashua, NH (US); Wilson T. MacDonald, Holliston, MA (US)

(73) Assignee: Computer Associates Think, Inc., Islandia, NY (US)

( * ) Notice: Subject to any disclaimer, the term of this patent is extended or adjusted under 35 U.S.C. 154(b) by 17 days.

(21) Appl. No.: 10/665,580

(22) Filed: Sep. 19, 2003

Related U.S. Application Data

(60) Provisional application No. 60/413,940, filed on Sep. 26, 2002.

(51) Int. Cl.
*G06F 11/30* (2006.01)

(52) U.S. Cl. ...................... 702/186; 709/226; 709/229; 717/112

(58) Field of Classification Search ................ 702/186; 709/230–231, 223–224, 227–229, 236, 246; 717/112, 120, 100, 122, 126, 101–102, 108–109
See application file for complete search history.

(56) References Cited

U.S. PATENT DOCUMENTS

| | | | | |
|---|---|---|---|---|
| 6,292,933 | B1 * | 9/2001 | Bahrs et al. | 717/107 |
| 6,317,438 | B1 * | 11/2001 | Trebes, Jr. | 370/466 |
| 6,450,411 | B1 * | 9/2002 | Rash et al. | 236/44 A |
| 6,662,357 | B1 * | 12/2003 | Bowman-Amuah | 717/120 |
| 6,665,725 | B1 * | 12/2003 | Dietz et al. | 709/230 |
| 2004/0221190 | A1 * | 11/2004 | Roletto et al. | 714/4 |

* cited by examiner

*Primary Examiner*—Bryan Bui
*Assistant Examiner*—Hien Vo
(74) *Attorney, Agent, or Firm*—Pillsbury Winthrop Shaw Pittman LLP

(57) ABSTRACT

A computer-based method of formatting rules for monitoring application responsiveness, the method including defining a collection of resources, each such resource being a source of application events; and defining a first transaction as a timeframe for measuring application responsiveness. The first transaction includes a pattern of application events from resources in the collection of resources, the pattern being defined as a block of constructs, wherein each construct in the block of constructs is selected from a group of construct syntaxes consisting of an event construct syntax, a choice construct syntax, a sequence construct syntax, and a last construct syntax. The the event construct syntax specifies a category of application events for the pattern to accept; the choice construct syntax specifies an option set of constructs from the group of construct syntaxes, any one of which is acceptable to the pattern; the sequence construct syntax specifies a sequence of constructs from the group of construct syntaxes, for the pattern to accept sequentially; and the last construct syntax specifies a final set of constructs from the group of construct syntaxes, such that the final set of constructs must be satisfied for the pattern to be matched.

10 Claims, 29 Drawing Sheets

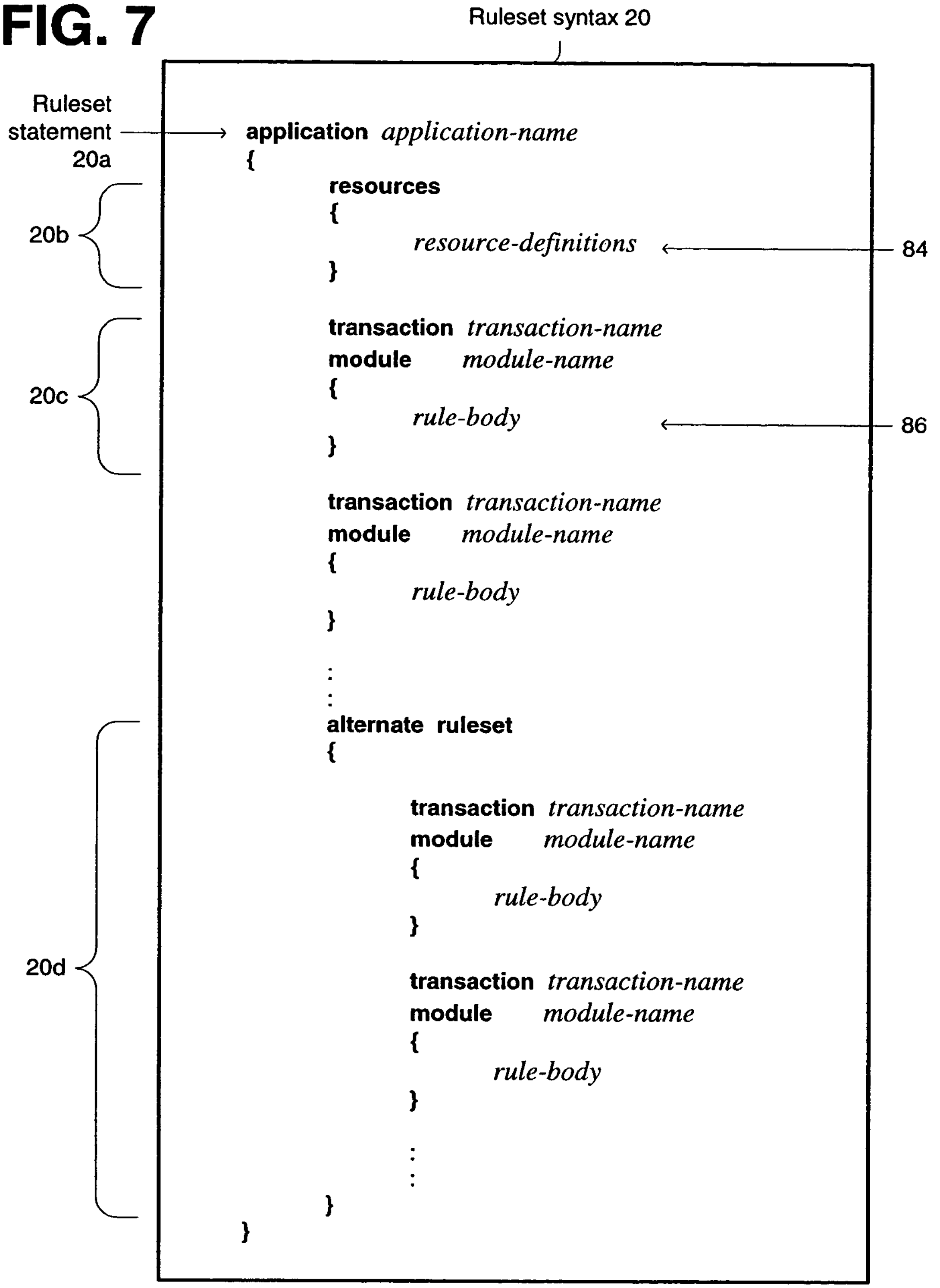

FIG. 7

Ruleset syntax 20

Ruleset statement 20a → application *application-name*
{

20b {
    resources
    {
        *resource-definitions* ← 84
    }

20c {
    transaction *transaction-name*
    module *module-name*
    {
        *rule-body* ← 86
    } transaction *transaction-name*
    module *module-name*
    {
        *rule-body*
    }

⋮

20d {
    alternate ruleset
    {
        transaction *transaction-name*
        module *module-name*
        {
            *rule-body*
        } transaction *transaction-name*
        module *module-name*
        {
            *rule-body*
        }

⋮
    }
}

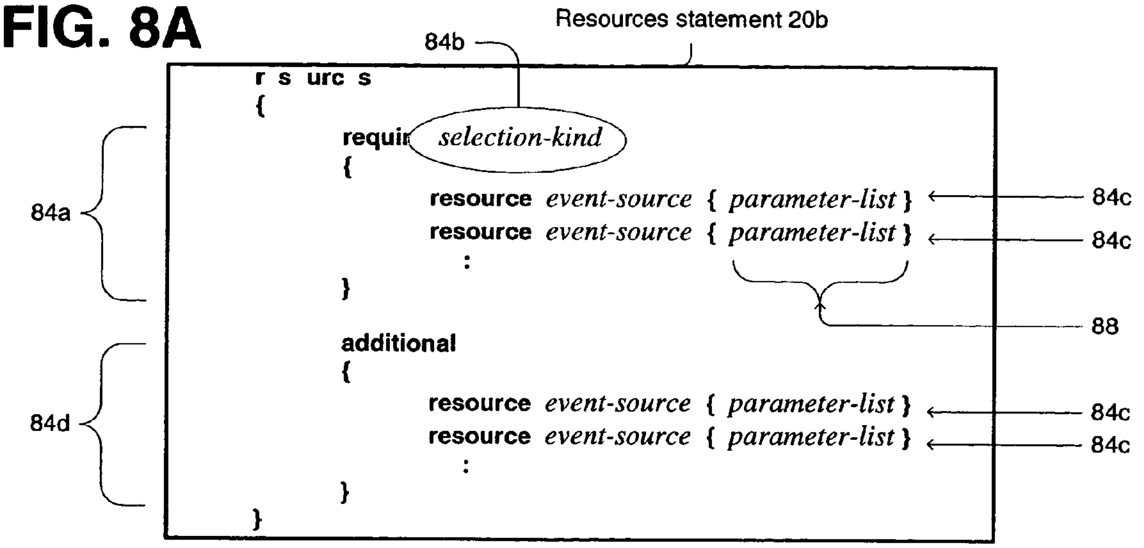

FIG. 8A

```
                                       Resources statement 20b
                    84b
     r s urc s
     {
         requir( selection-kind )
         {
84a          resource event-source { parameter-list }    ← 84c
             resource event-source { parameter-list }    ← 84c
                  :                                      ← 88
         }

         additional
         {
84d          resource event-source { parameter-list }    ← 84c
             resource event-source { parameter-list }    ← 84c
                  :
         }
     }
```

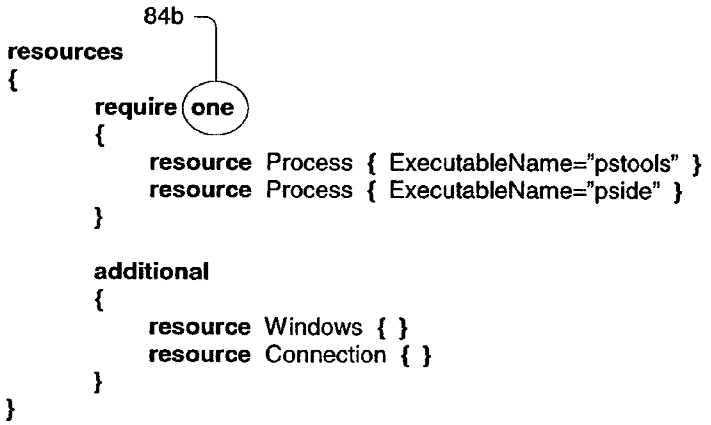

FIG. 8B

```
                    84b
     resources
     {
         require (one)
         {
             resource Process { ExecutableName="pstools" }
             resource Process { ExecutableName="pside" }
         }

         additional
         {
             resource Windows { }
             resource Connection { }
         }
     }
```

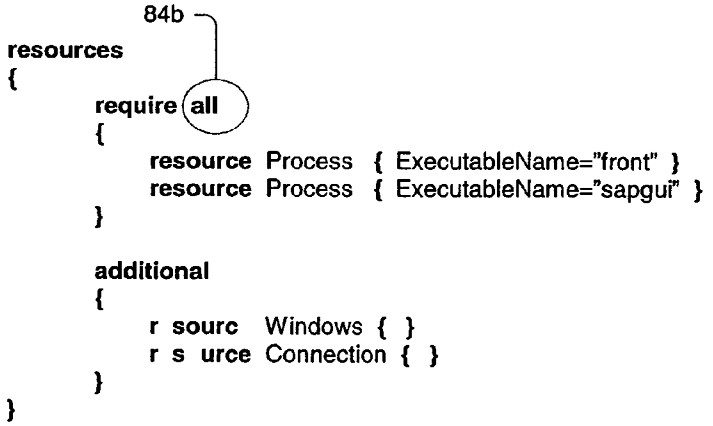

FIG. 8C

```
                    84b
     resources
     {
         require (all)
         {
             resource Process { ExecutableName="front" }
             resource Process { ExecutableName="sapgui" }
         }

         additional
         {
             r sourc  Windows { }
             r s urce Connection { }
         }
     }
```

FIG. 9E

Last construct 86i

86a → *event-specification*

```
last
{
    event-specification
    event-specification
        :
        :
}
```

FIG. 9F

```
transaction "UpdateEmployeeRecord"
module      "PrimaryOperations"
{
    event "1-of-5" Windows SetFocus { Title="Correction – Personal Data" }
    event "2-of-5" Windows ButtonPress { Text="OK" }
    event "3-of-5" Windows SetFocus
    {
        Title=" Administer Workforce (U.S.) – Use – Personal Data"
    }
    event "4-of-5" Windows MenuCommand { Text="File->Save" }
    event "5-of-5" Windows StatusMessage { Text="Record Saved" }
}
```

FIG. 9G

```
transaction "AddNewEmployee"
module      "PrimaryOperations"
{
    choice
    {
        sequence   # Manually enter employee data
        {
            event "1-of-3(A)" Windows SetFocus { Title="Enter Employee Data" }
            event "2-of-3(A)" Windows MenuCommand { Text="Record->Save" }
            event "3-of-3(A)" Windows StatusMessage { Text="Record Saved" }
        }

        sequence   # Import employee data from a file
        {
            event "1-of-3(B)" Windows SetFocus { Title="Import Employee Record" }
            event "2-of-3(B)" Windows MenuCommand { Text="Record->Save" }
            event "3-of-3(B)" Windows StatusMessage { Text="Record Imported" }
        }
    }
}
```

FIG. 9H
```
transaction "ScheduleAppointment"
module      "Calendar"
{
    # Begin with the pressing of the "Schedule" button.
    event "1-of-2" Windows ButtonPress
    {
          ParentTitle="New Appointment"   Text="Schedule"
    }

    # End with the last networking event to the database server.
    last
    {
      event "2(A)-of-2" Connection Request { }
      event "2(B)-of-2" Connection Response { }
    }
}
```
86i
FIG. 10A
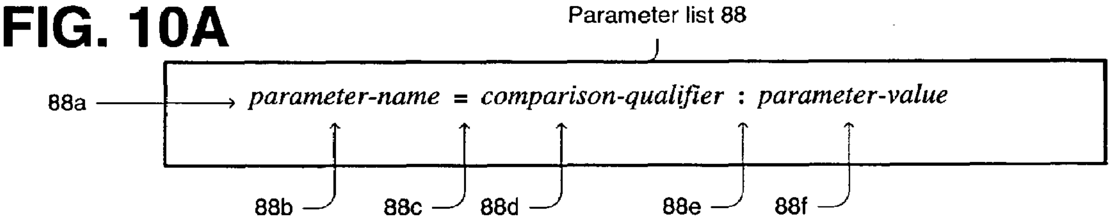
FIG. 10B
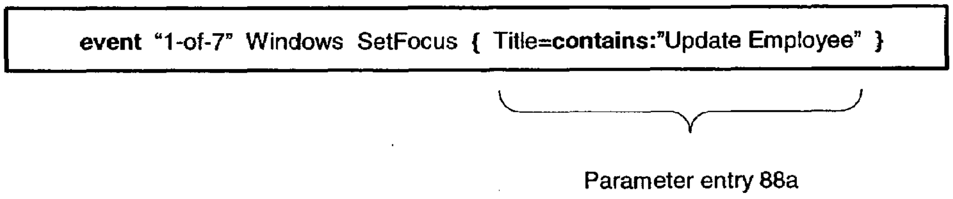
FIG. 10C
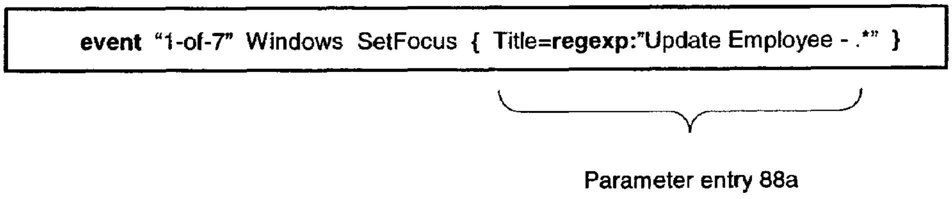

```
resources
{
    r quir    n
    {
        resource Process { ExecutableName=$(Application Executable) }
        resource Process { ExecutableName="CERNER" }
        resource Process { ExecutableName="CERNADV" }
    }
    additional
    {
        resource Windows { }
        resource Connection { }
    }
}
```

FIG. 11E

Example ruleset 16

86i

```
application "Web"
{
    resources
    {
        require one
        {
            resource Web { }
        }
        additional
        {
            resource Connection { }
        }
    }

    transaction "BrowseAnywhere"
    module "AR"
    {
        # Begin page download.
        choice
        {
            event "BeginDownload" Web BeginLoad {URL=contains:$(URLs)}
        }

        # End page download.
        event "EndDownload" Web EndLoad { }
    }
}
```

```
transaction "BrowseAnywhere"
module "AR"
{
   # Begin page download.
   choice
   {
     event "BeginDownload" Web BeginLoad { URL=contains:$(URLs) }
     event "BeginDownload" Web BeginLoad { URL=contains:"www.concord.com" }
     event "BeginDownload" Web BeginLoad { URL=contains:"www.irs.ustreas.gov" }
   }

   # End page download.
   event "EndDownload" Web EndLoad { }
}
```

FIG. 11G

```
transaction "BrowseAnywhere"
module "AR"
{
    # Begin page download.
    event "BeginDownload" Web BeginLoad { URL=contains:$(URLs) }
    event "BeginDownload" Web BeginLoad { URL=contains:"www.concord.com" }
    event "BeginDownload" Web BeginLoad { URL=contains:"www.irs.ustreas.gov" }

    # End page download.
    event "EndDownload" Web EndLoad { }
}
```

FIG. 11H

```
resources
{
    require one
    {
        resource Process { ExecutableName="CERNER" }
    }
    additional
    {
        resource Windows {  }
        resource Connection { Hostname=$(Server Host) Port=%(Server Port) }
    }
}
```

FIG. 12

Example ruleset 16

```
application "EmployeeManagement"
{
    resourc s      # The application consists of a single executable.
    {
        require one
        {
            resource Process { ExecutableName="EmplMgmt" }
        }

        additional
        {
            resource Windows { }
            resource Connection { }
        }
    }

    #
    # User-level transactions. Only monitor new employee and employee
    # update operations.
    #

    transaction "NewEmployee"
    module      "UserOperations"
    {
        event "1-of-2" Windows MenuCommand { Text="New->Record..." }
        event "2-of-2" Windows StatusMessage
        {
            Text="New employee record created."
        }
    }

    transaction "EmployeeUpdate"
    module      "UserOperations"
    {
        event "1-of-2" Windows MenuCommand { Text="Edit->Save" }
        event "2-of-2" Windows StatusMessage { Text="Employee record updated." }
    }

    #
    # AR-level transactions. Monitor every window transition.
    #

    alternate ruleset
    {
        transaction "ARWindowTransition"
        module      "AROperations"
        {
            event "1-of-2" Windows SetFocus { }
            event "2-of-2" Windows SetFocus { }
        }

    }
}
```

APPLICATION RESPONSE MONITOR

TECHNICAL FIELD

This invention relates to network monitoring systems, and more particularly to application response monitoring.

BACKGROUND

Application response monitoring systems measure and report on the performance of computer applications, especially as regards procedures or transactions initiated by user input. Such systems measure the delay between a user issuing an instruction to an application to perform a given action, and the application being ready to receive a next instruction from the user. Some systems also measure stages within the transaction and can report how much of the delay is due to each stage. Application response monitoring systems are used professionally by both developers of applications and by administrators of computing environments in which applications are used.

"Point-and-click" describes a style of graphical user interface (GUI) for computers. Microsoft's Windows, Apple's MacOS, many UNIX variants, and other operating systems feature point-and-click GUIs. In one common configuration, a computer includes a display screen, a mouse, and a keyboard. The operating system (OS) renders a pointer on the display screen and moves the pointer in response to movements of the mouse by a human user. The pointer acts a virtual tool within the GUI to indicate areas to interact with. The mouse includes a button that is clicked by the user. The user's keystrokes from the keyboard are still another form of user interaction.

Typically, some software applications running on the computer have visible windows in the GUI. At any given time, one of the windows has "focus", i.e., is the default recipient of keystrokes. The user can interact with controls in a window, such as buttons, icons, menus, and so forth, or can change the focus to a different window. A similar notion of focus exists among controls within a window, i.e., the "active" control is the default destination for keystrokes when multiple controls are present.

SUMMARY

In general, in one aspect the invention features a computer-based method of formatting rules for monitoring application responsiveness. The method involves defining a collection of resources, each such resource being a source of application events; and defining a first transaction as a timeframe for measuring application responsiveness. The first transaction includes a pattern of application events from resources in the collection of resources, wherein the pattern is defined as a block of constructs and each construct in the block of constructs is selected from a group of construct syntaxes consisting of an event construct syntax, a choice construct syntax, a sequence construct syntax, and a last construct syntax. Also, the event construct syntax specifies a category of application events for the pattern to accept; the choice construct syntax specifies an option set of constructs from the group of construct syntaxes, any one of which is acceptable to the pattern; the sequence construct syntax specifies a sequence of constructs from the group of construct syntaxes, for the pattern to accept sequentially; and the last construct syntax specifies a final set of constructs from the group of construct syntaxes, such that the final set of constructs must be satisfied for the pattern to be matched.

Other embodiments include one or more of the following features. The step of defining the first transaction includes associating the transaction with a module of one or more transactions. The method also involves defining a second transaction based on the collection of resources.

In general, in another aspect, the invention features another computer-based method of monitoring networked application responsiveness. In this case, the method involves detecting an application instance that has a stream of application events; instantiating a finite state machine to recognize transactions in the stream of application events for the application instance, the finite state machine including a collection of states and a collection of transitions, each such transition having criteria for events that qualify to transition between a source state for the transition and a destination state for the transition, the source state and the destination state being among the collection of states; associating a first token with an initial state in the collection of states; processing the stream of application events sequentially, including, for each such event, comparing the event to a processed transition in the collection of transitions and associating an event token with the destination state of the processed transition if the event satisfies the criteria of the processed transition; and recognizing a transaction if a final state in the collection of states is associated with the event token for a candidate event in the stream of application events.

In general, in yet another aspect, the invention features another computer-based method of monitoring networked application responsiveness. In this case, the method involves receiving a message that specifies a responsiveness measure, a client, a server, and a networked service; selecting from a database a path corresponding to the client and the server, and a client set corresponding to the client; and adding the responsiveness measure to an aggregate sample of a plurality of clients, the aggregate sample selected according to the set, the path, and the networked service.

Other embodiments of this invention include one or more of the following features. The method also involves formulating a predicted responsiveness profile based on the aggregate sample; and if the responsiveness measure deviates from the predicted responsiveness profile by an amount given by a predetermined formula, creating an alert condition for the deviation.

In general, in still another aspect, the invention features a computer-based method of identifying user interface objects in a windowing environment. The method involves constructing a collection of string descriptions of window properties, including generating a base string description for a base window having an ancestry hierarchy of parent windows, and recursively generating subsequent string descriptions of the parent windows by following the ancestry hierarchy; calculating a hash of the collection of string descriptions; identifying the base window with an object identifier that combines an application name for an application associated with the base window, a numeric length of the collection of string descriptions, and the hash.

Other embodiments of this invention include one or more of the following features. The object identifier includes string separators separating the application name, the numeric length, and the hash.

In general in still yet another aspect, the invention features a computer-based method of monitoring networked application responsiveness. The method involves receiving a message that specifies a responsiveness measure, a client, a server, and a networked service; selecting from a database a path corresponding to the client and the server, and a client set corresponding to the client; and adding the responsiveness measure to an aggregate sample of a plurality of clients, the aggregate sample selected according to the set, the path, and the networked service.

Other embodiments of this invention also involve formulating a predicted responsiveness profile based on the aggregate sample; and if the responsiveness measure deviates from the predicted responsiveness profile by an amount given by a predetermined formula, creating an alert condition for the deviation.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7 is a syntax for a ruleset.

FIG. 8A is a syntax for a resources statement.

FIGS. 8B and 8C are examples of resources statements.

FIG. 9E is a syntax for a last construct in a construct statement.

FIGS. 9F, 9G, and 9H are examples of transaction statements.

FIG. 10A is a syntax for a parameter entry.

FIGS. 10B and 10C are examples of event specifications.

FIG. 11D is the example ruleset of FIG. 11C, expanded for multiple substitution values.

FIG. 11E is an example ruleset using substitutable parameters and a choice construct.

FIGS. 11F and 11G are example rulesets based on the ruleset of FIG. 11E, expanded for multiple substitution values.

FIG. 11H is an example ruleset using substitutable parameters for network resources.

FIG. 12 is an example ruleset incorporating an alternate ruleset.

DETAILED DESCRIPTION

Figure 1A:
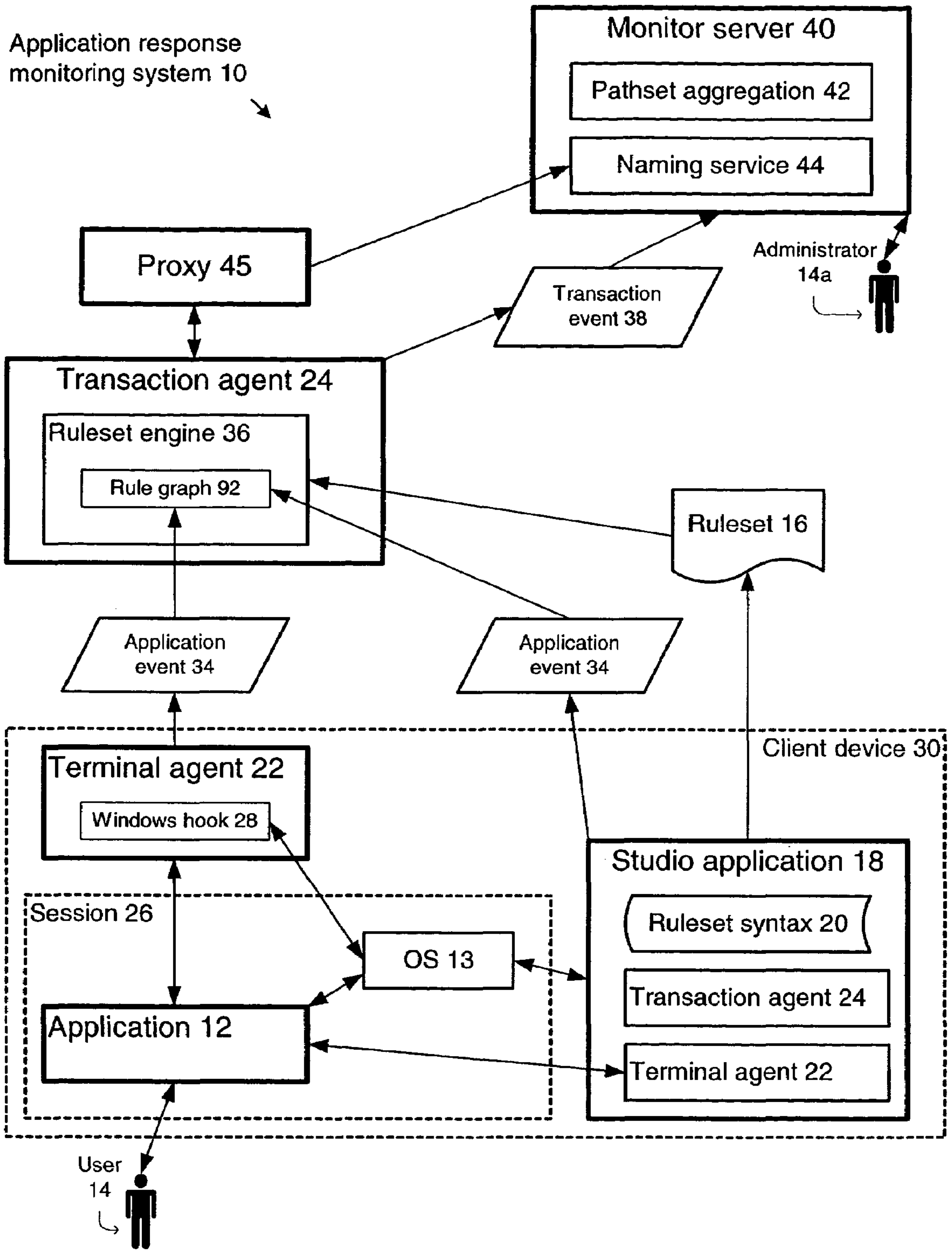
FIG. 1A is a diagram of elements of an application response monitoring system.

Referring to FIG. 1A, in functional overview, an application response monitoring system 10 (or “system”) measures the responsiveness of GUI applications 12 used by a human user 14. Measuring responsiveness includes measuring the duration of transactions initiated by user 14, where a transaction is a collection of events that fits a predetermined pattern. For a given application 12, system 10 monitors events in order to detect such a pattern. For example, a pattern could specify both a first event of a user clicking on a dialog to submit a database query to an inventory application, and a second, terminal event of the application beginning to display results to the user. The time it takes for this pattern to transpire, i.e., for this transaction to complete, is a measure of the responsiveness of the application.

System 10 includes facilities for an administrator 14*a* to define the transactions that system 10 monitors. A ruleset 16 is an information structure that defines a transaction in system 10. Studio application 18 is a software program that allows a user to demonstrate a transaction by carrying out sample user interactions with an application 12, while system 10 automatically captures events from the demonstration. The events are stored in a script which can be replayed repeatedly, allowing a user to perform iterative cycles of testing and refining a ruleset, each time against identical input. Studio application 18 also generates rulesets 16 according to a ruleset syntax 20, which describes a textual format for rulesets 16.

During operation, a terminal agent 22 monitors an application 12 in a session 26 corresponding to user 14. As will be explained in more detail, terminal agent 22 uses information from a transaction agent 24 to characterize applications in terms of sources of events. Terminal agent 22 includes specialized event source objects to monitor various sources of event information. For example, terminal agent 22 includes a Windows hook 28 that monitors an event source of an operating system 13 of client device 30, where operating system 13 is one of the Microsoft Windows family of operating systems. Windows hook enables terminal agent 22 to monitor events in a message stream exposed by the operating system.

When terminal agent 22 detects an eligible event, it forwards a application event object 34 representing the event to transaction agent 24. Application event object 34 contains information describing the transaction, such as data on the user 14, the session 26, the corresponding application 12, and the time and duration of the transaction.

Transaction agent 24 receives a stream of application event objects 34 over time and examines the stream for transaction patterns. A ruleset engine 36 in transaction agent 24 reads rulesets 16 and uses them to recognize transactions among application events passed to transaction agent by terminal agent 22. Ruleset engine 36 includes a rule graph 92, which acts as a state machine for each actively monitored application 12.

Upon recognizing a transaction, transaction agent 24 sends a transaction event object 38 to monitor server 40, which is a software process that centralizes responsiveness data. Often, multiple terminal agents 22 and transaction agents 24 are distributed over multiple devices to monitor client sessions 26, each transaction agent 24 reporting to a shared monitor server 40.

Monitor server 40 also includes a naming service 44 that identifies transaction agents 24 robustly, even when the corresponding agents change identity under logical network address schemes such as DNS (domain name service) or IP (internet protocol) addressing. A proxy 45 associated with transaction agent 24 ensures that messages are sent to monitor server 40 at least at regular intervals. The messages include the current logical network address of the transaction agent 24, helping naming service 44 maintain a valid address for transaction agent 24.

Monitor server 40 includes features to store and retrieve responsiveness information for use by administrator 14*a*. For example, pathset aggregation 42 supports real-time statistical analysis of event streams from clients, even in cases where the event stream from an individual client is so sparsely active that variance over short periods of time (for example, an hour or less) is not statistically significant, compared to any sample based on an individual stream. Pathset aggregation treats event streams from multiple clients as a single stream, allowing system 10 to measure statistically significant deviations from baseline behaviors over a time frame measured, for example, in minutes rather than hours.

Figure 1B:
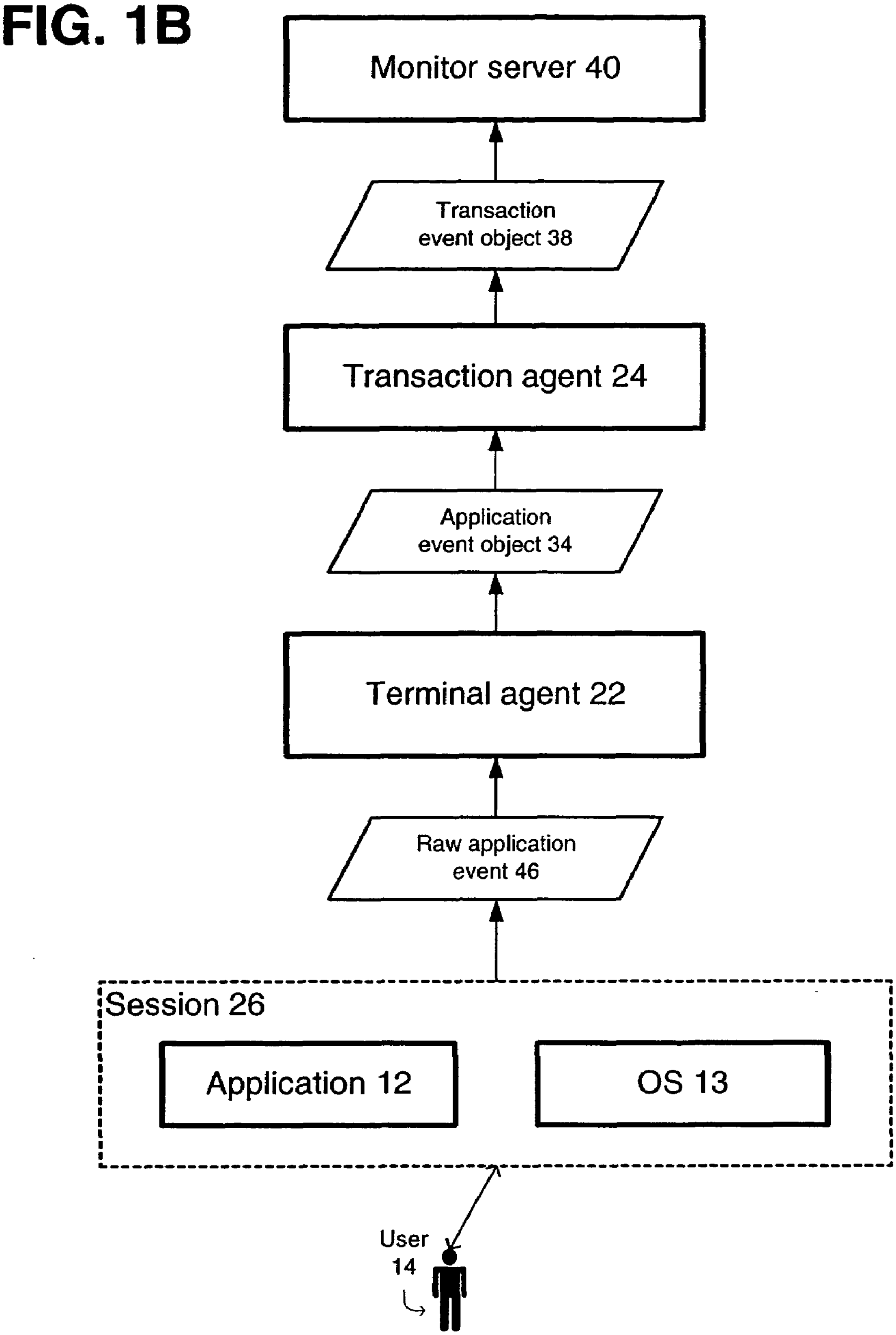
FIG. 1B is a dataflow diagram of event streams in an application response monitoring system.

Referring to FIG. 1B, system 10 includes a number of event streams. A transaction specifies a pattern of application events over time. Typically, a transaction represents a related set of application operations—in particular, a set of operations whose rate of execution or response time is being monitored by system 10. System 10 uses at least two levels in its representation of the workings of an application 12. First, as will be explained in more detail, the application operations are represented by raw application events 46 exposed within a session 26. Raw application events 46 are the raw data that terminal agent 22 gleans. For example, Windows hook 28 gathers raw application events 46 from operating system 13. Second, some raw application events 46 are in turn represented by application event objects 34. Terminal agent 22 monitors raw application events 46 and generates a stream of application event objects 34 representing the subset of application operations which transaction agent 24 is currently configured to sample, based on loaded rulesets 16 (FIG. 1A).

The stream of application event objects 34 is transformed into a different event stream by transaction agent 24, which adds a transaction event object 38 to an event stream informing monitor server 40 of recognized transactions.

Physical Configuration

Referring to FIGS. 2A–2C and FIGS. 3A–3C, the architecture of system 10 supports multiple physical configurations, such that sessions can be monitored while running on standalone devices 48 or on terminal client devices 60.

Figure 2A:
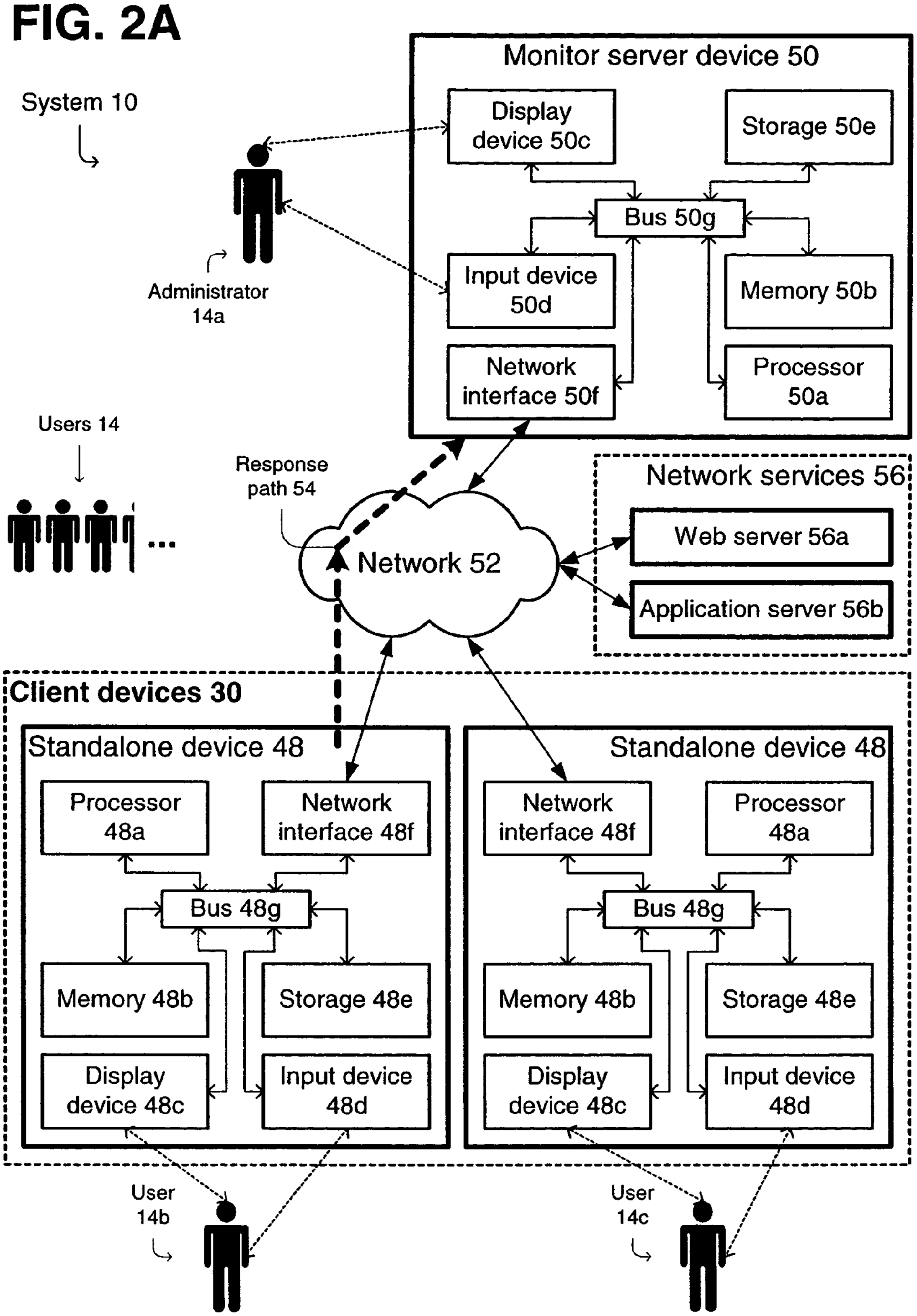
FIG. 2A is a block diagram of physical components of an application response monitoring system, including standalone client devices.

Referring to FIG. 2A, in one physical configuration, system 10 includes a monitor server device 50 and one or more client devices 30, such as standalone devices 48. Users 14, such as users 14*b* and 14*c*, interact with applications running locally on standalone devices 48. One example of a standalone device 48 is a conventional personal computer running Microsoft Windows 98, with applications 12 in a session 26 executing locally (FIG. 1A).

Monitor server device 50 executes instructions that encode the software process of monitor server 40. Typically, an administrator 14*a* has privileged responsibilities for maintaining monitor server device 50 and monitor server 40, as well as other components of system 10.

Monitor server device 50 and standalone devices 48 communicate with one another over a network 52. For example, application event objects 34 follow a response path 54 from standalone devices 48 across network 52. Standalone devices 48 also communicate with network services 56 such as web server 56*a* and application server 56*b*.

Figure 2B:
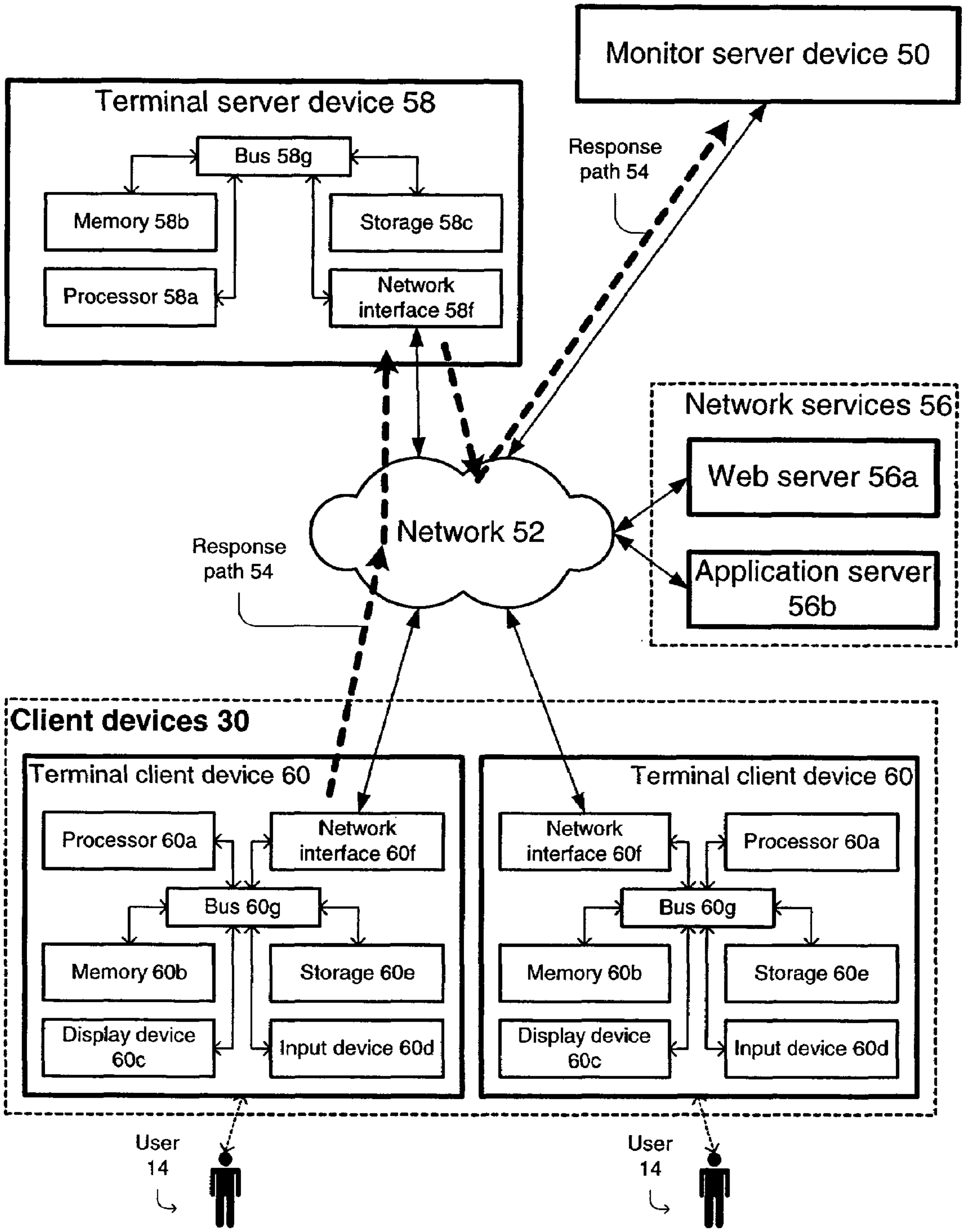
FIG. 2B is a block diagram of physical components of an application response monitoring system, including terminal client devices and a terminal server.

Referring to FIG. 2B, in another physical configuration, system 10 includes monitor server device 50, terminal server device 58, and one or more client devices 30 such as terminal client devices 60. Terminal client devices 60 are user-interface front ends (also known as "thin clients") for application logic that executes on terminal server device 58. In general, users 14 interact with terminal client devices 60, but software on terminal server device 58 chooses the automated responses. Thus, for terminal client devices 60, the response path 54 for user actions first goes to terminal server device 58, then proceeds to monitor server device 50.

Figure 2C:
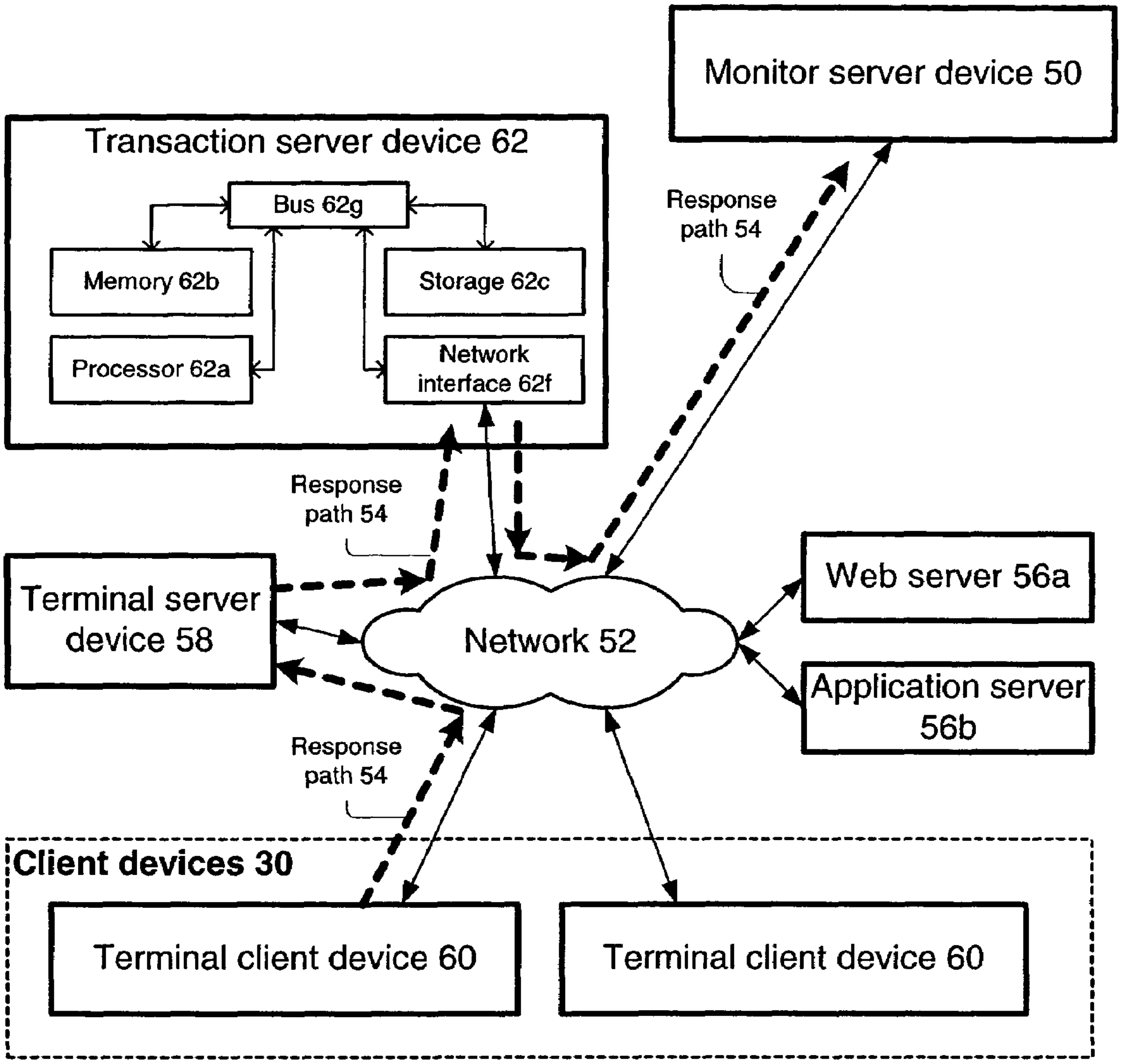
FIG. 2C is a block diagram of the application response monitoring system of FIG. 2B, further including a transaction server device.

FIG. 2C shows system 10 in a physical configuration similar to that of FIG. 2B, with the addition of transaction server device 62. In this configuration, terminal server device 58 detects application events but passes them to transaction server device 62 for remote processing, relative to terminal server device 58. In this case, response path 54 routes from terminal server device 58 to transaction server device 62 and then to monitor server device 50.

The physical configurations shown in FIGS. 2A–2C are not mutually exclusive. That is, system 10 can include a combination of the described configurations, for example both standalone devices 48 and terminal client devices 60. Throughout this description, the term "client device" applies to both standalone devices 48 and terminal client devices 60.

Logical Configuration

The configuration of logical components, e.g., software, can vary according to the physical configuration of system 10. The logical architecture and operation of system 10 will now be explained with regard to FIGS. 3A–3C.

Figure 3A:
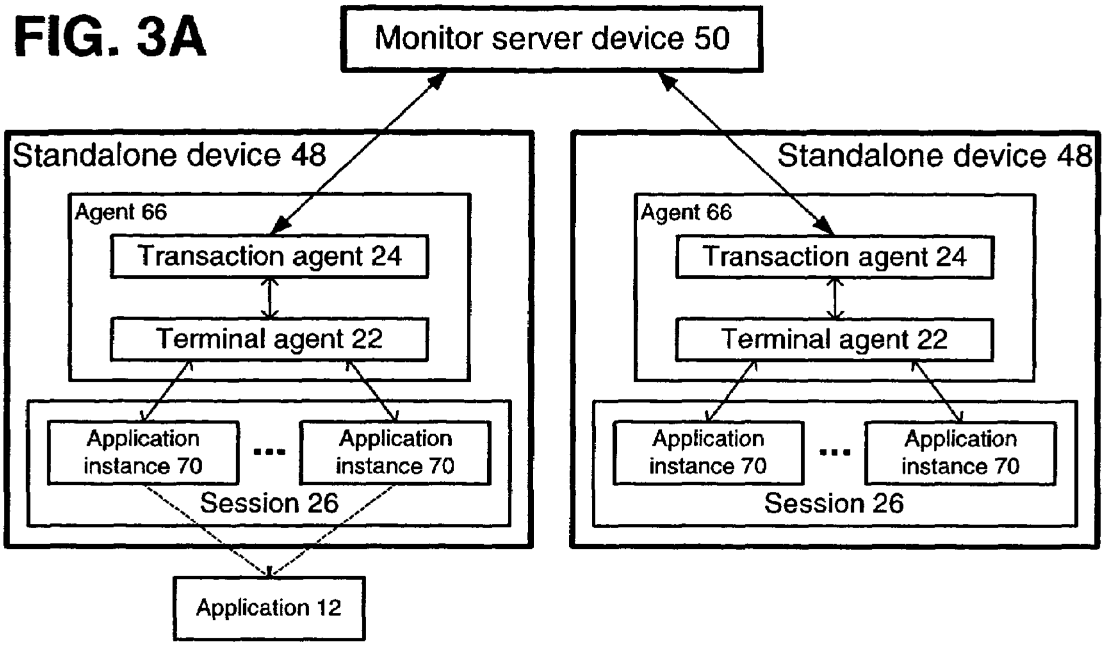
FIG. 3A is a block diagram of agents deployed on standalone client devices.

Referring to FIG. 3A, which reflects the physical configuration shown in FIG. 2A, a standalone device 48 runs a collection of application instances 70, in a session 26 for a user 14. An application instance 70 is an active, independent copy of the machine-executable instructions that encode a software application 12. For a given application 12, it is possible for a user 14 to start multiple application instances 70 running simultaneously in the same session 26. The state of each simultaneous application instance 70 is independent of the other application instances 70. Typically, each instance is derived from a single collection of code. As will be explained, system 10 handles responsiveness data for each application instance 70 separately.

Standalone device 48 also runs an agent 66, which is a distributed software entity that monitors application instances 70 and reports on their activity when detected events conform to predefined transactions. In particular, each agent 66 reports to monitor server 40.

In the configuration shown in FIG. 3A, agent 66 includes a terminal agent 22 and a transaction agent 24. Terminal agent 22 detects events for a collection of application instances 70. For each such event, terminal agent 22 passes an event object to transaction agent 24, which analyzes the events over time to detect transactions. Transaction agent 24 notifies monitor server device 50 of each detected transaction.

Figure 3B:
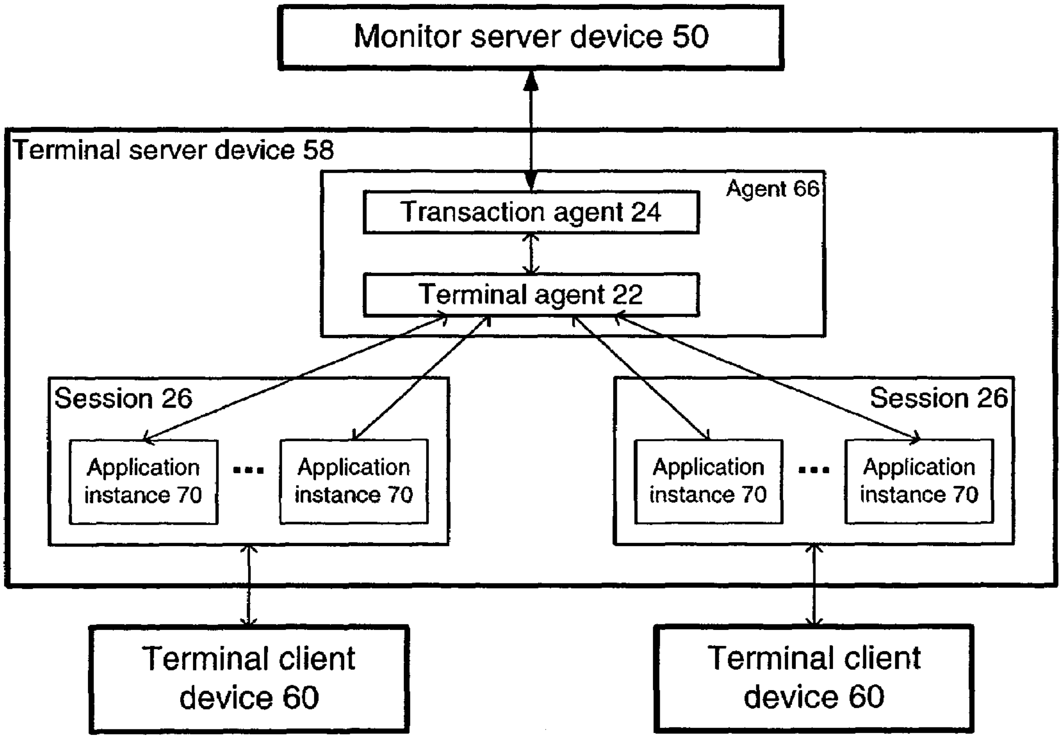
FIG. 3B is a block diagram of an agent deployed on a terminal server device.

Referring to FIG. 3B, which reflects the physical configuration shown in FIG. 2B, terminal server device 58 has a collection of terminal client devices 60. Terminal server device 58 maintains a distinct session 26 for each terminal client device 60 in the collection. Each such session 26 has a collection of application instances 70. In this configuration, terminal server device 58 runs an agent 66 that is common to all the sessions 26. Terminal agent 22 gathers events across multiple sessions 26. Transaction agent 24 analyzes each event in the context of its corresponding session 26.

Figure 3C:
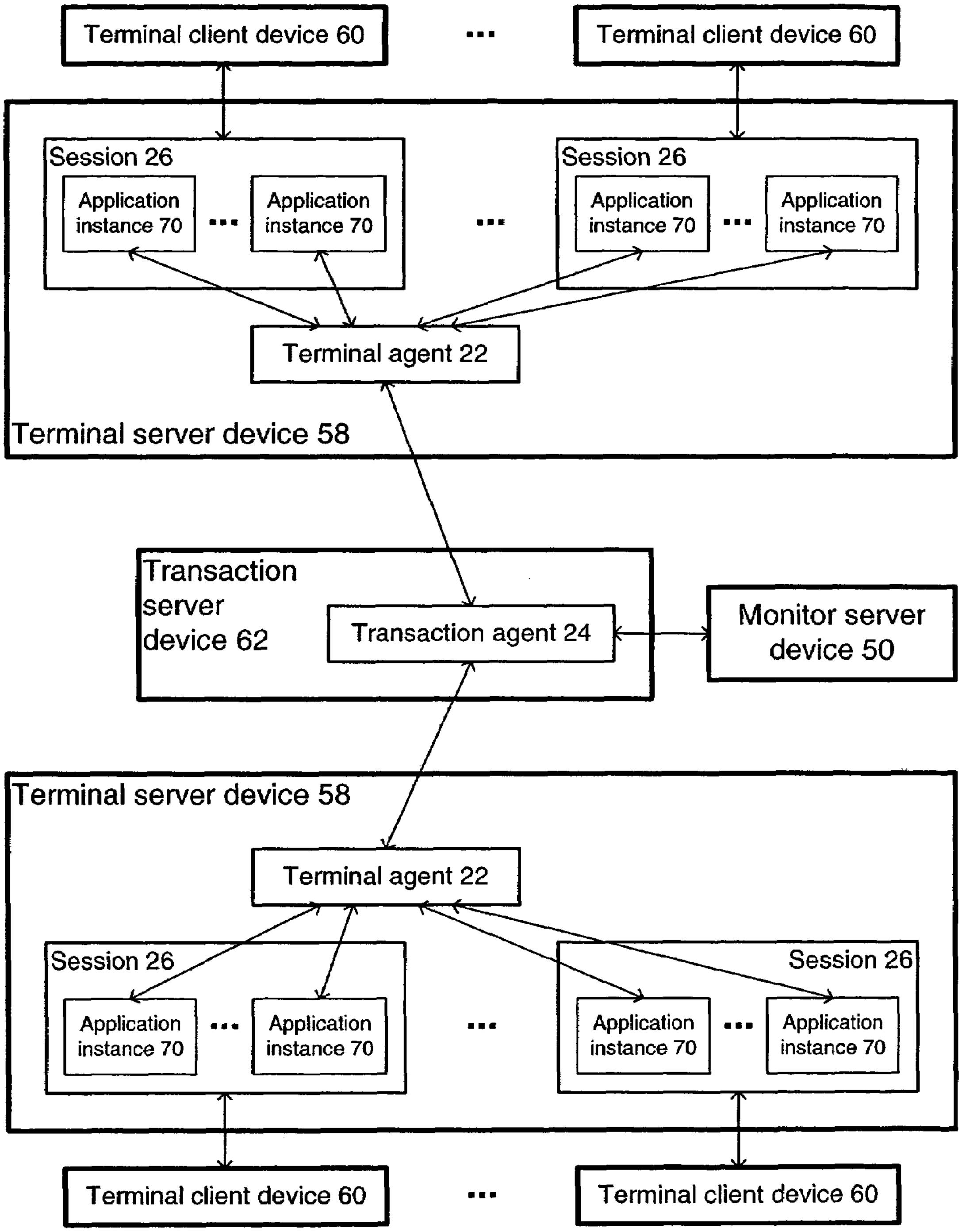
FIG. 3C is a block diagram of terminal agents deployed on terminal server devices and a transaction agent deployed on a transaction server device.

Referring to FIG. 3C, which reflects the physical configuration shown in FIG. 2C, a terminal server device 58 has a terminal agent 22, which gathers events across multiple sessions 26 of the terminal server device 58. Terminal agent 22 passes the events to transaction agent 24, which runs on a transaction server device 62, remote relative to terminal server device 58. Furthermore, in this example, a given transaction agent 24 is shared by two terminal agents 22 on two distinct terminal server devices 58. In general, a given transaction agent 24 can support one or more terminal agents 22, regardless of whether they are local or remote.

Resources and Resource Instances

Terminal agent 22 monitors events that occur for various facilities of session 26—for example, windowing processes, TCP connections to servers, and web browsers. Typically, the facility to be monitored provides an API (application programming interface) that exposes the necessary events to inspection. For example, the Microsoft Windows operating system has an API that notifies subscribing objects when a window is created, is destroyed, receives focus, loses focus, updates its title, and so forth.

Figure 4:
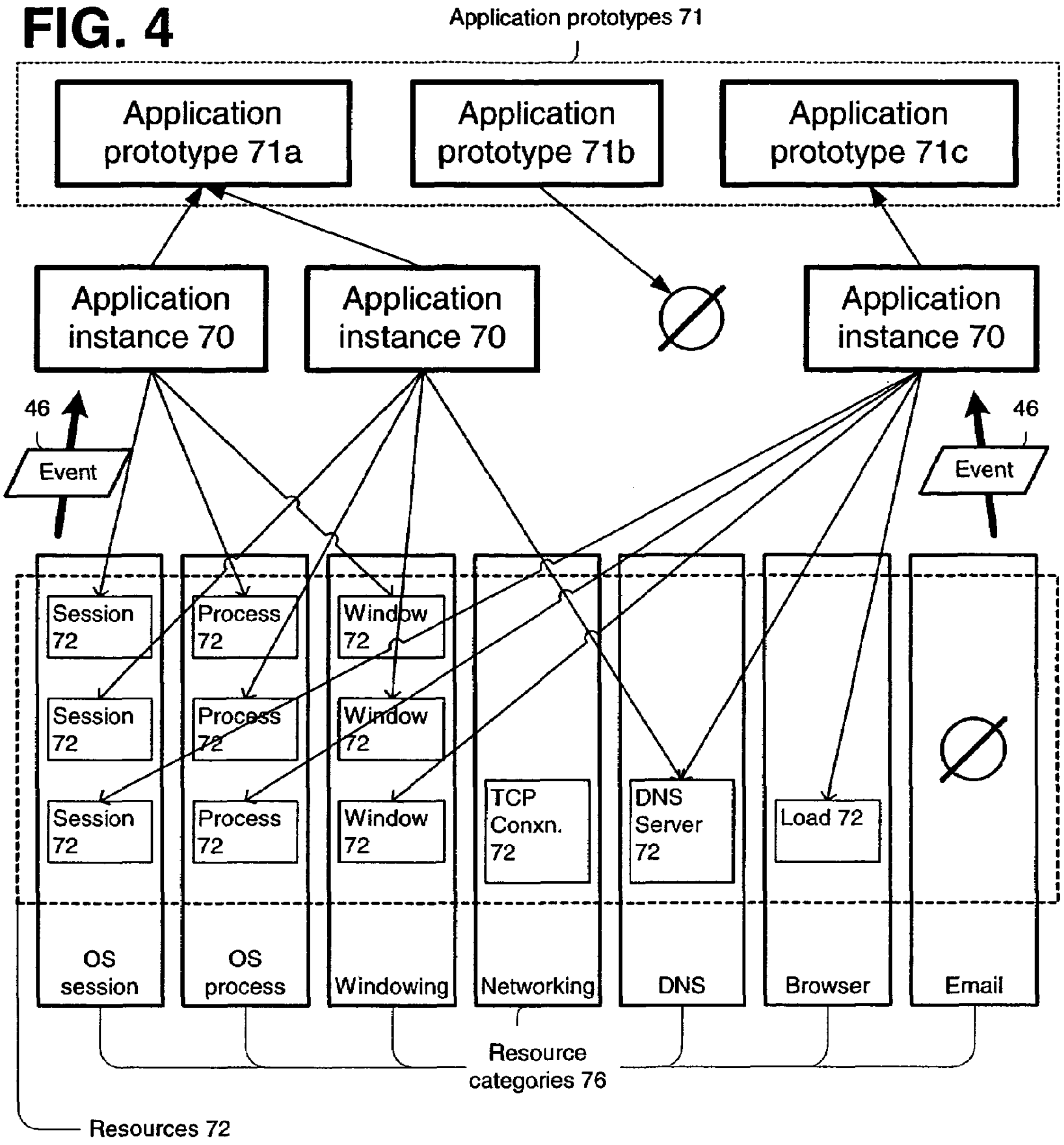
FIG. 4 is a block diagram of relationships between applications and resources.

Referring to FIG. 4, a resource 72 is a dynamic source of raw application events 46, monitored by an event source object in terminal agent 22. A raw application event 46 indicates a change of state for a monitored resource 72. For instance, each GUI process running on a client device 30 would be represented by a separate resource 72, and a separate raw application event 46 would originate from one of these resources 72 for each button press, dialog pop-up, etc. Each application instance 70 uses one or more resources 72.

Each resource 72 has a resource category 76, according to which terminal agent 22 categorizes raw application events 46 from that resource 72. In general, for each different resource category 76, terminal agent 22 uses a different event source object to monitor raw application events 46.

A resource category 76 is persistent, in the sense that it is stably defined until terminal agent 22 is reconfigured. In contrast, a resource 72 has a dynamic existence over time. When a resource 72 exists, it is a "live" source of raw application events 46, but a resource 72 can terminate. For example, when a GUI process terminates, its corresponding resource 72 terminates, too.

System 10 includes resource categories 76 for OS session, windowing, networking, DNS, browser, email, and OS process. An OS session resource 72 represents a session 26. A windowing resource 72 represents a GUI process for a window or control. A networking resource 72 represents a non-DNS networking entity such as a TCP connection; DNS resources 72 representing DNS servers. Resource categories 76 exist for applications, too. For example, a browser resource 72 represents a web browser, and an email resource 72 represents an email client. An OS process resource 72 represents a generic process in the OS.

Within the architecture of system 10, an application instance 70 is a collection of resources 72. Like resources 72, an application instance 70 is dynamic, i.e., comes into and goes out of existence. Often, in practice, an application instance 70 corresponds to an executable, which is a collection of machine instructions that encode a software application. From this perspective, an application instance 70 represents an active, evolving example of the executable's instructions in action, with states and properties associated with carrying out the instructions. When the operating system allows, one set of instructions can be the basis for multiple such examples in a session. Each such example would be represented by independent application instances 70. Note, however, that application instance 70 is customizable, and in the general case a single application instance 70 can correspond to multiple executables. For example, for a user process that involves data entry into a database form, after which an automatic email is sent describing the data in the form via an email program, an administrator 14*a* could define an application instance 70 that encompasses both the executable for the database form and the executable for the email program. An application prototype 71 represents the template from which a given application instance 70 is created in system 10. As will be explained in more detail, the definition of an application prototype 71 and its derived application instance 70 is encoded in a ruleset.

In the example of FIG. 4, which shows three application instances 70 and a variety of resources 72 at a moment in time, an application prototype 71*a* is the basis for two application instances 70. Another application prototype 71*c*, shown on the right, is the basis for a single application instance 70. The application prototype 71*b* in the center has no currently associated application instance 70.

Each application instance 70 has a collection of resources 72. Each of the resource categories 76 in the example has an active resource 72, except for the category for email. Each of the resources 72 in this example is associated with an application instance 70, except for a connection resource 72.

A given resource 72 can be shared by multiple application instances 70. In the example of FIG. 4, the application instance 70 at the center and the application instance 70 at the right both use the DNS server resource 72.

Event Streams and Transactions

Figure 5:
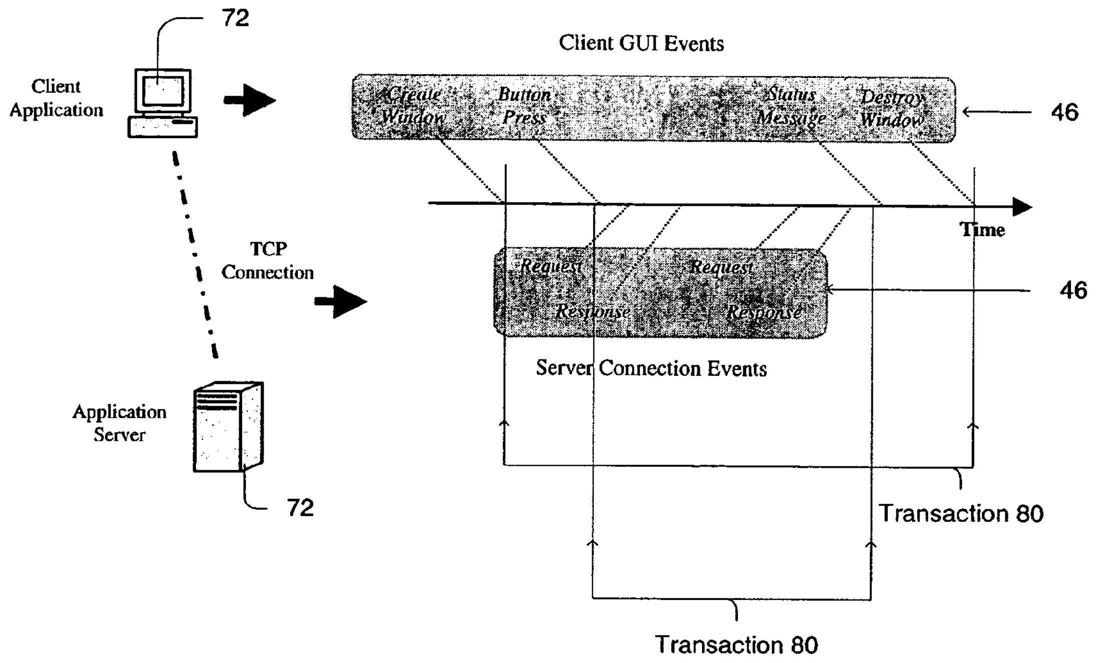
FIG. 5 is an example timeline of events with transactions noted.

Referring to FIG. 5, the stream of raw application events 46 from any resource 72 is independent of the streams from any other resources 72. An example client/server application instance 70 includes two resources 72: a client GUI process and a TCP connection to an application server. Raw application events 46 for each resource are depicted along a timeline. The transaction agent 24 sees two independent streams of raw application events 46, one from the client GUI process (events for window creation, button press, etc.) and one from the network connection (events for outgoing requests and incoming responses, for example). There is no inherent relationship between these streams, even though they originate from the same application instance 70.

A transaction 80 specifies a pattern of application operations over time, as reflected by events corresponding to the operations. A transaction definition includes criteria that select which application event objects 34 will satisfy the pattern. A transaction definition also optionally includes time ordering among the criteria, indicating an order in which application event objects 34 must occur to satisfy the pattern.

Transactions 80 can be nested or can overlap. In the example shown in FIG. 5, a first transaction extends from a "create window" event to a "destroy window" event, while a second transaction occurs within the first, extending from a "button press" event to a "status message" event.

Figure 6:
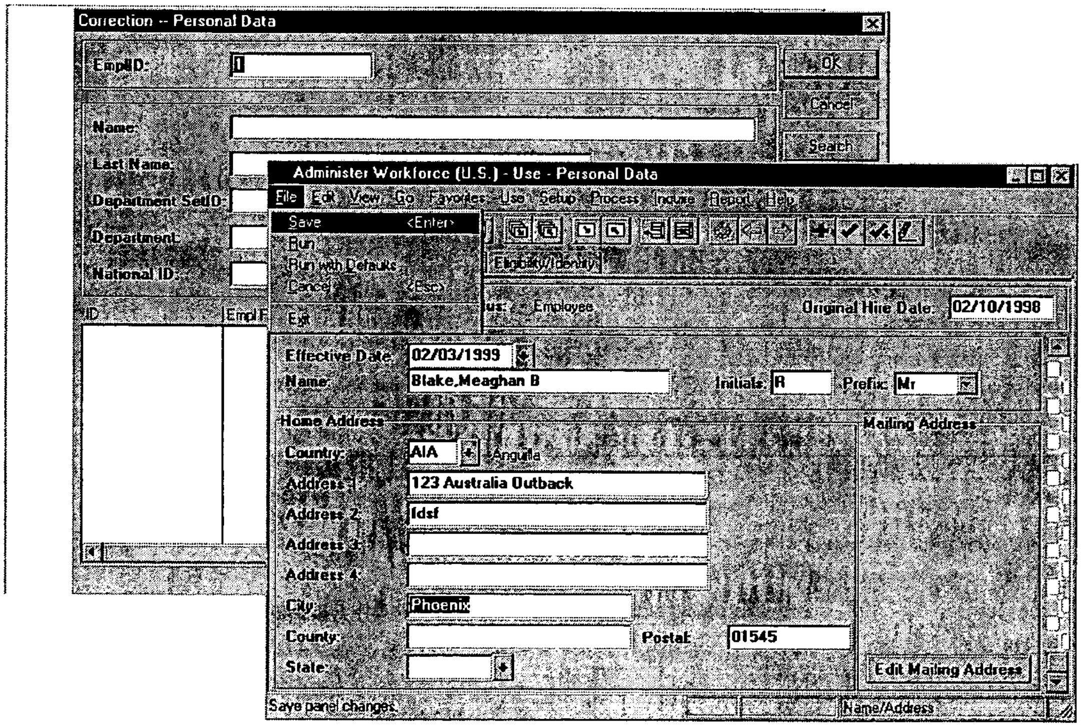
FIG. 6 is an example of a “Correction-Personal Data” window.

FIG. 6 illustrates another transaction example from a user's perspective. The example transaction 80 uses a starting window named "Correction-Personal Data". A user 14 enters an employee identification number and clicks the "OK" button. The "Administer Workforce (U.S.)-Use-Personal Data" window then appears. The user edits the employee record and saves it using the "File->Save" menu item. One set of criteria for this transaction is:

1. Window gets focus. Window name is "Correction-Personal Data".
2. Button is pressed. Button name is "OK".
3. Window appears. Window name is "Administer Workforce (U.S.)-Use-Personal Data".
4. Menu command is invoked. Command is "File->Save".
5. Status message appears. Message is "Record Saved".

Ruleset Syntax

Referring to FIG. 7, a ruleset syntax 20 governs the textual format for rulesets. The format includes the name of the application, the application's resource definitions, and some number of transaction recognition rules. That is, for a given application, multiple transactions can be defined via ruleset syntax 20.

Ruleset syntax 20 allows for portions of the text to be ignored by transaction agent 24 when the compliant ruleset 16 is parsed, for example so that human-readable explanations can be added. In particular, the hash sign "#" and all subsequent characters on a line are ignored. For clarity of explanation, the following description of ruleset syntax 20 will assume that no comments are present.

Ruleset syntax 20 begins with a ruleset statement 20*a*, which defines the boundaries of the ruleset being defined. Ruleset statement 20*a* includes the static keyword "application", followed by a name for the ruleset, followed by a block of text encased in curly braces (i.e., "{ }"). The rest of the ruleset is nested within this block of text.

Ruleset syntax 20 next includes a resources statement 20*b*, which specifies resources 72 that will provide events for the associated transaction. Resources statement 20*b* includes the static keyword "resources", followed by resource definitions block 84, which is another block of text encased in curly braces. Resource definitions block 84 lists resources 72 to be monitored.

After the resources statement 20*b*, ruleset syntax 20 includes one or more transaction statements 20*c*. A transaction statement 20*c* tells the ruleset engine 36 how to recognize the operations and transactions 80 that are occurring within a running application 12. Transaction statement 20*c* includes the static keyword "transaction", followed by a transaction name, which is followed by the static keyword "module", a module name, and a rule body block 86 encased in curly braces. Rule body block 86 is a block of text that specifies a pattern of events that characterizes the transaction.

Optionally, an alternate ruleset statement 20*d* follows transaction statement 20*c*. An alternate ruleset statement 20*d* allows the definition of additional transactions for a given application 12 within the same ruleset. As will be explained in more detail, system 10 can monitor such transactions independently. Therefore, the transactions can have different scope. For example, the transactions can be nested.

Resource Definitions

Referring to FIG. 8A, a resource definitions block 84 tells the ruleset engine 36 how to recognize a running instance of an application 12 in terms of resources 72.

Resource definitions block 84 includes a required resource section 84*a*, which identifies resources 72 that must exist in order for the application 12 to be running. Often, this includes the processes of the application 12. In general, though, any number of resources can be specified.

A required resource section 84*a* is designated by the static keyword "require", followed by a selection kind 84*b* that identifies how many of the specified resources must exist before the application is considered to be running. Selection kind 84 can be selected from the qualifier keywords "one", "any", or "all". The keyword "one" indicates that each resource 72 matching one of the resource specifications should be considered a separate running application instance 70 (e.g., an application with one or more GUI executables). The keyword "any" indicates that any resource 72 matching one of the resource specifications should be considered part of a single application instance 70, although resources matching all of the specifications need not be active at the same time (e.g., an application with multiple processes that come and go out of existence). The keyword "all" indicates that resources 72 matching all of the specifications must simultaneously exist in order for the application 12 to be considered to be running (e.g., an application with separate GUI and networking executables).

Required resource section 84*a* further includes a curly-braced block that lists resource specifications 84*c*. For each resource to be monitored for an application, an event source is specified in a resource specification 84*c*, which begins with the static keyword "resource", followed by a name (shown as "event-source" in FIG. 8A), and a bracketed parameter list (shown as "parameter-list" in FIG. 8A) that specifies any number of parameters that further qualify the desired resource. Resource specifications 84*c* are explained in more detail with regard to FIG. 9B.

Resource definitions block 84 also optionally includes an additional resource section 84*d* that identifies any further resources that should be monitored as part of the application. This can include transient resources (those that come and go out of existence during the lifetime of the application) as well as the types of activity to monitor for the "required" processes (network connections, windowing activity, web (URL) activity, etc.). Additional resource section 84*d* is designated by the static keyword "additional", followed by a curly-braced block of resources formatted as resource specifications 84*c*.

Even if an application's transaction definitions do not explicitly reference the application's networking activity events, a "Connection" resource definition is often included in application resource definitions so that the networking activity is monitored by the agent and exposed to subsequent analysis as a distinguishable factor affecting response time.

Referring to FIG. 8B, an example resource definition for an installation of a PeopleSoft application includes the application's GUI executables along with their windowing activity and database connections. Because each GUI process operates independently, the "one" keyword 84*b* is used.

Referring to FIG. 8C, another example resource definition for an installation of an SAP application uses the "all" keyword 84*b* because both the GUI process ("front") and networking process ("sapgui") must be running for the application to be executing.

Rule Body Block

Whereas resource definitions tell the ruleset engine 36 how to recognize a running instance 70 of an application, transaction definitions tell the engine how to recognize the operations that are occurring within the application after it is running. This involves telling the engine the one or more sequences of events to look for that characterize the transaction.

Figure 9A:
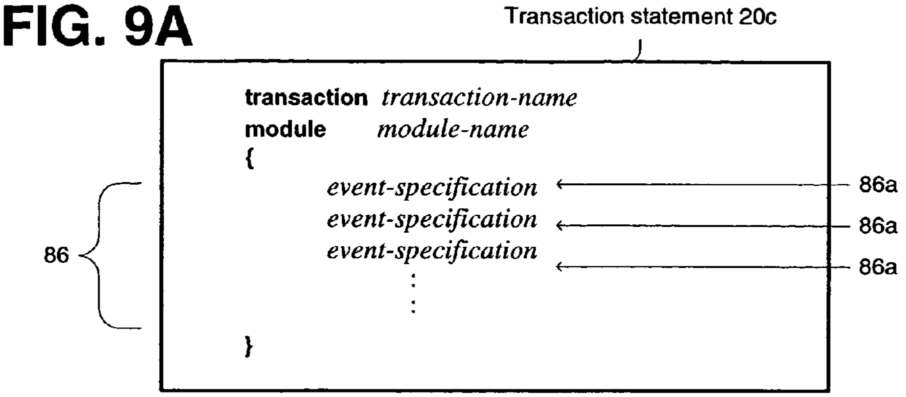
FIG. 9A is a syntax for a transaction statement.

Referring to FIG. 9A, transaction statement 20*c* includes rule body block 86, which includes a list of one or more event specifications 86*a*. Often, an event specification 86*a* is for a single event, i.e., is "atomic". However, as will be explained in more detail, an event specification 86*a* can include collections of event specifications 86*a*, with recursive structure. An atomic event specification 86*a* identifies an event source from which the event originates, the kind of event (button press, SQL request, etc.), and any event-specific parameters that further qualify the event.

Figure 9B:
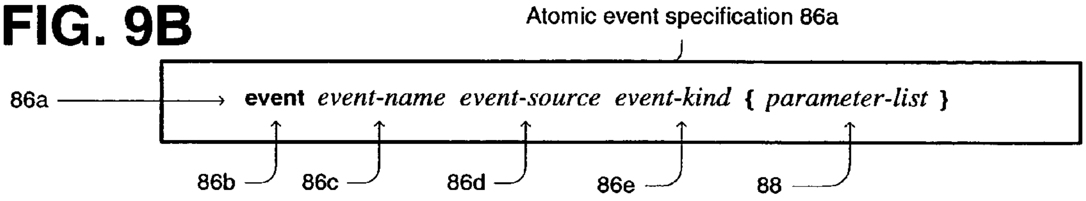
FIG. 9B is a syntax for an event statement in a transaction statement.

Referring to FIG. 9B, in an atomic form, event specification 86*a* includes a static keyword "event" 86*b*, an event name 86*c*, an event source 86*d*, an event kind 86*e*, and a curly-braced parameter list 88. Event source 86*d* specifies a type of event source object for terminal agent 22 to use to gather raw application events 46. Event kind 86*e* specifies a kind of event produced by the event source, for instance for specificity in case the event source produces multiple kinds of objects. Parameter list 88 provides parameters that further qualify the events to look for; the parameter list syntax is typically specific to each event. Parameter list 88 may be empty. Parameter list 88 is explained in more detail with regard to FIG. 10A.

Event name 86*c* is also part of the syntax for event specification 86*a*. Event name 86*c* is ignored by ruleset engine 36 but acts as a debugging aid, allowing a human ruleset developer using studio application 18 to easily correlate the behavior of the ruleset engine 36 with the actual steps supplied in the transaction definition. Any name may be supplied here and does not need to be a unique identifier.

Figure 9C:
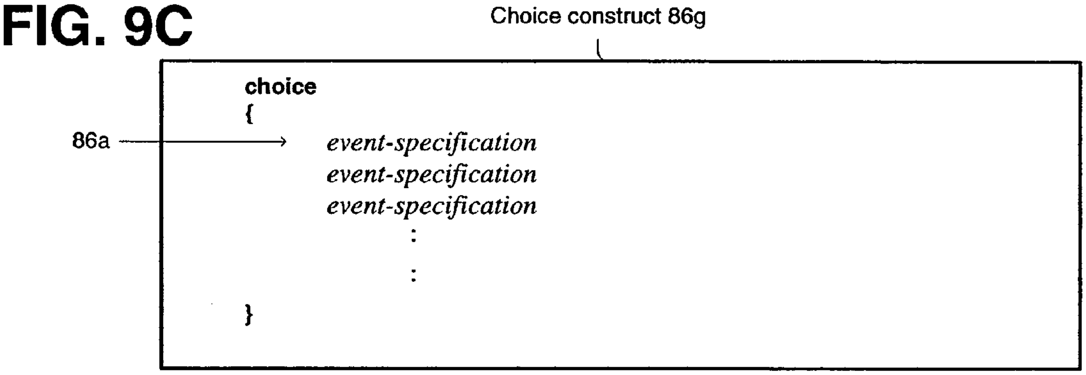
FIG. 9C is a syntax for a choice construct in a transaction statement.
Figure 9D:
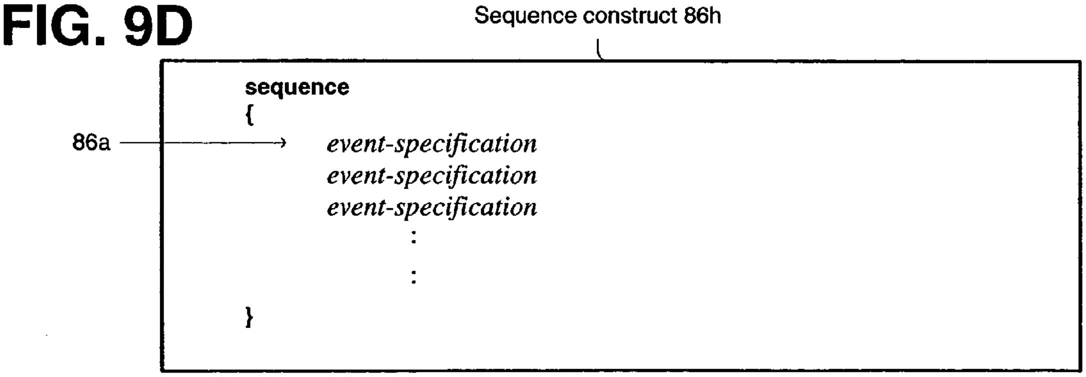
FIG. 9D is a syntax for a sequence construct in a transaction statement.

Referring to FIGS. 9C through 9E, rule body block 86 permits nested event specifications 86*a*, i.e., constructs that include lists of event specifications 86*a*, such as a choice construct 86*g*, a sequence construct 86*h*, and a last construct 86*i*. The choice 86*g* and sequence 86*h* constructs can be mutually nested and can be nested recursively to create still more involved constructs.

Referring to FIG. 9C, choice construct 86*g* allows multiple, alternative event sequences to be specified for a transaction. Ruleset engine 36 considers choice construct 86*g* to be satisfied if any one of the specified event specifications 86*a* is observed. Each event specification 86*a* can itself be an atomic event specification 86*a*, a choice construct 86*g*, or a sequence construct 86*h*.

Referring to FIG. 9D, sequence construct 86*h* allows a series of events to be specified for a transaction. Ruleset engine 36 considers sequence construct 86*h* to be satisfied if all of the specified event specifications 86*a* are observed to occur in order within the application (albeit with possibly other events interspersed, or "interrupting" the series). Each event specification 86*a* can itself be an atomic event specification 86*a*, a choice construct 86*g*, or a sequence construct 86*h*.

Ruleset syntax 20 treats the main rule body block 86 of a transaction statement 20*c* as an implicit sequence construct 86*h*. Thus, ruleset engine 36 requires entities of rule body block 86 to occur in sequence in order to satisfy rule body block 86.

Referring to FIG. 9E, last construct 86*i* allows an iterative series of events (of indeterminate number) to be specified for a transaction. Ruleset engine 36 considers last construct 86*i* to be satisfied if an uninterrupted series of events (each of which matches some event specification 86*a* in the list) is observed to occur. More specifically, the last such matching event is considered to satisfy the construct 86*i*. Note that this contrasts with sequence construct 86*h*, at least in that sequence construct 86*h* allows unspecified events to interrupt the specified series, while last construct 86*i* does not.

Each event specification 86*a* in the last construct 86*i* must be atomic. Choice constructs 86*g*, sequence constructs 86*h*, and last constructs 86 are not permitted to be nested inside a last construct 86*i*.

Referring to FIG. 9F, an example ruleset encodes the example transaction 80 discussed with regard to FIG. 6. This example includes a sequence of five atomic events.

Referring to FIG. 9G, an example ruleset encodes a transaction 80 that can be performed in either of two ways. A user of the application can create a new employee record by either manually entering the employee's data into a screen, or by importing it from a file.

Referring to FIG. 9H, an example ruleset encodes a transaction 80 for a calendar management application. The ruleset characterizes the scheduling of an appointment by the user first pressing the "schedule" button, followed by several exchanges with a database server. A last construct 86*i* identifies the network activity occurring at the end of the transaction. The last construct 86*i* is useful here because the number of Request/Response events may vary with each appointment scheduled.

Parameter Lists

Both resources statement 20*b* and transaction statements 20*c* involve parameter lists that help to qualify the resource or event being specified. Ruleset syntax 20 includes a generalized syntax for parameter lists.

Referring to FIG. 10A, a parameter list 88 includes zero or more parameter entries 88*a*. Each entry 88*a* includes a parameter name 88*b*, an operator 88*c*, and a parameter value 88*f*. Name 88*b* is the name of the parameter, value 88*f* is a value for that parameter, and operator 88*c* is a comparison operator such as "=". The syntax supports both string and numeric values. For string values, special embedded characters such as quotation marks and backslashes are prefaced with the backslash ('\') character.

The syntax for parameter entries 88*a* also supports a pattern-matching notation. This can be useful, for example, in order to recognize a window title that contains some varying component (e.g. an employee ID number). Pattern matching allows the window title to be selected based on the invariant portion of the title. Accordingly, entry 88*a* optionally further includes a comparison qualifier 88*d* and a delimiter 88*e*. Comparison qualifier 88*d* can be selected from the static keywords "exact", "contains", and "regexp". The "exact" keyword is the default when comparison qualifier 88*d* is absent. The "exact" keyword requires the value supplied by the resource or event to match the specified value 88*f* exactly (though without sensitivity to case). The "contains" keyword specifies a sub-string search. The "regexp" keyword indicates that value 88$f$ is a regular expression, to be evaluated accordingly.

Referring to FIG. 10B and FIG. 10C, two ruleset samples each feature a parameter entry 88$a$ portion. Both rulesets identify a window that contains the text "Update Employee—" followed by the employee ID number.

Substitution Parameters

Rulesets 16 can be designed to monitor several types of applications. Examples include a "Windows" ruleset to monitor basic window-to-window transitions within an application, and a "Web" ruleset to monitor page downloads of selected URLs. There can be a large (or total) degree of overlap between rulesets used by different user populations, perhaps only differing in certain parameter values for resources or events such as the name of the GUI executable, or the identity of the URL being monitored. Ruleset syntax 20 supports the development and deployment of generic rulesets 16 that are portable between such environments.

Figure 11A:
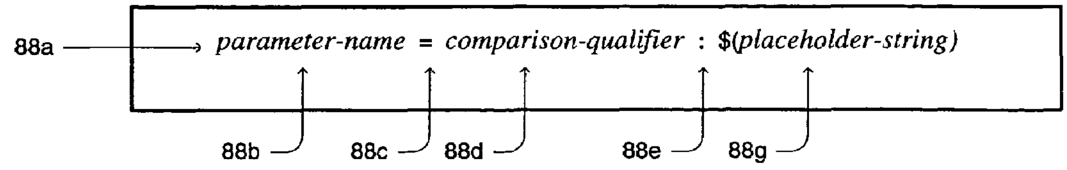
FIGS. 11A and 11B are additional syntaxes for a parameter entry.
Figure 11B:
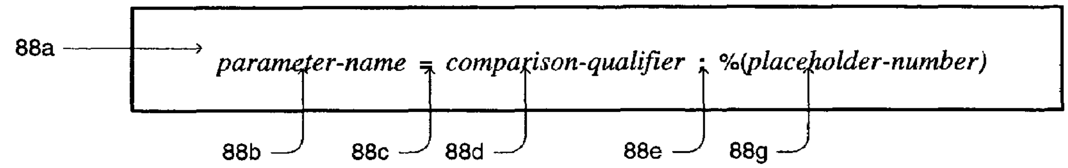

Referring to FIG. 11A and FIG. 11B, placeholders indicate parameters that should be filled in with customized values. Parameter entry 88$a$ can have a placeholder variable 88$g$ instead of parameter value 88$f$. The placeholder variable 88$g$ is encased in parentheses. When the placeholder variable 88$g$ is a string data type, a dollar sign precedes the encased placeholder variable 88$g$; when the placeholder variable 88$g$ is a numeric data type, a percentage sign precedes it.

Figure 11C:
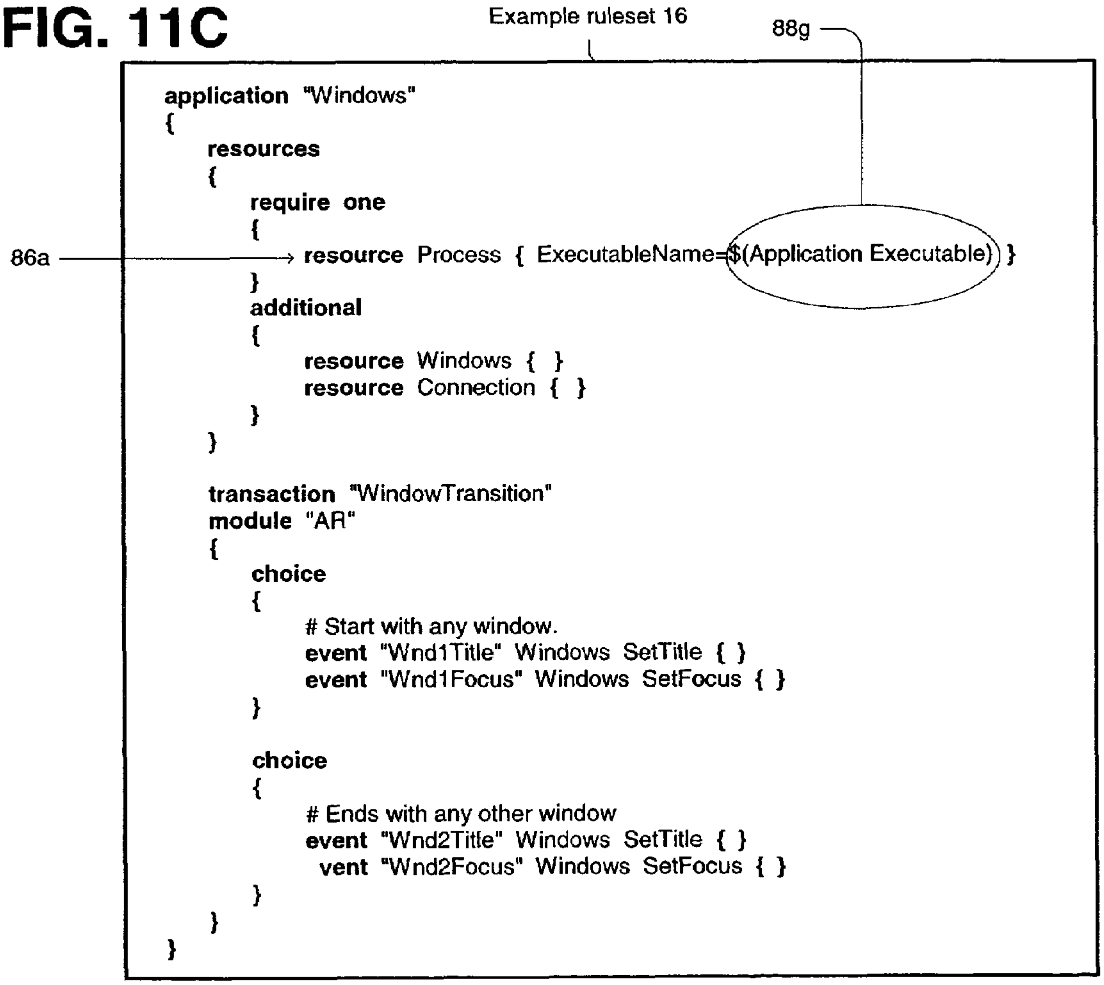
FIG. 11C is an example ruleset using substitutable parameters.

Referring to FIG. 11C, an example ruleset definition for the generic "Windows" application type names no specific GUI executable. Instead, the placeholder "$(Application Executable)" indicates that one or more "Application Executable" names must be supplied.

Referring to FIG. 11D, when configuring the ruleset 16 of FIG. 11C, system 10 will prompt the user to supply one or more values for the "$(Application Executable)" placeholder. (The user can edit the values in studio application 18 later, as well). Upon receiving values for the placeholder, the system will expand the resources statement 20$b$ to include the values. For example, if "CERNER" and "CERNADV" were supplied as values for this parameter, the resources statement 20$b$ would be expanded to reflect both values, as shown in FIG. 11D.

The event specification 86$a$ containing the placeholder 88$g$ remains within the expanded ruleset to indicate that the subsequent definitions represent substituted values. If the placeholder definition is removed, then the parameter values will no longer be editable via studio application 18. However, the placeholder definition has no impact on the recognition of transactions. Ruleset engine 36 ignores placeholders 88$g$ and uses only the expanded definitions (with the substituted values) to recognize transactions 80.

Referring to FIGS. 11E to 11G, when parameter values specify a set, any one of which is sufficient to satisfy the parameterized event specification 86$a$, a choice construct 86$g$ is in order. An example ruleset 16 contains a placeholder value 88$g$ for URL(s) to be monitored. The placeholder value 88$g$ is inside text that uses the syntax of a choice construct 86$g$. When configuring this ruleset 16, system 10 prompts the user to supply one or more values for the URL parameter. Because potentially multiple values can be supplied for the parameter, the choice construct 86$g$ is needed to provide the correct semantics once the definition is expanded. If the user supplied the values "www.concord-.com" and "www.irs.ustreas.gov" for the URLs parameters, then the transaction definition should expand into the form shown in FIG. 11F. Without the syntax of the choice construct 86$g$, the transaction definition would have expanded into an incorrect definition where the transaction required both the URL events to occur, and in a sequential order, as shown in FIG. 11G.

Referring to FIG. 11H, system 10 treats substitutable parameters somewhat differently when the parameters are for resources 72 involving networking, such as resources 72 from resource categories 76 (FIG. 4) "Connection" and "DNS". The values for such parameters are automatically taken from the definitions of servers affiliated with the application. In the example shown in FIG. 11H, a portion of an example ruleset that uses a "Connection" resource is automatically expanded at runtime using the hostname/port specifications of servers affiliated with to the application. As a result, the corresponding terminal agent 22 only monitors the network activity of such servers when monitoring the "CERNER" application, ignoring network activity to other servers.

Alternate Ruleset

It can be useful to monitor an application using two different rulesets simultaneously. For example, an application could be monitored both at a user transaction level while at the same time being monitored at a more granular, networking response time level. The transactions that occur will differ between the levels, but will overlap in time (the user level transactions will be comprised of the networking transactions as well as other activity). The discussion with regard to FIG. 5 provides another example of overlapping transactions.

Transaction agent 24 supports several approaches to monitoring an application using multiple rulesets. In one approach, multiple rulesets 16 can be created using identical resource definitions. The same application activity will then be independently analyzed for evidence of transactions using each application's ruleset. However, for reporting and administrative purposes, the separate rulesets are independent. There is no correlation between the monitored data for them.

A second approach to multiple rulesets is to embed the alternate transaction definitions within the same overall application definition, using the alternate ruleset statement 20$d$. Transaction agent 24 analyzes an application's activity for transactions using each alternate ruleset defined, independently. However, the transactions recognized under each alternate definition (and their corresponding response information) are recorded under the same overall ruleset. Note that alternate rulesets cannot be nested, and that all transaction definitions that occur outside the scope of an alternate ruleset construct are treated as if they belong to a single alternate ruleset definition.

Referring to FIG. 12, for an example ruleset 16, the transaction agent will monitor the application (embodied in the EmplMgmt.exe executable) looking for occurrences of "NewEmployee" and "EmployeeUpdate" transactions, while simultaneously recording a transaction for each window transition that occurs within the application ("AR Window Transition").

Modules

Referring again to FIG. 7, each transaction has transaction name and a module name in the corresponding transaction statement 20$c$. Each transaction name is unique. Module names provide a mechanism for grouping individual transactions into a single unit for reporting purposes on monitor server 40. If a transaction should not be grouped with other ones for reporting, then its module name should be unique—for instance, identical to its transaction name.

In the examples discussed with regard to FIG. 9F and FIG. 9G, both the "UpdateEmployeeRecord" and "AddNewEmployee" transactions shared the "PrimaryOperations" module name. Monitor server 40 would therefore collect the response data for these two transactions together and would report it under the single module name.

Transaction Agent

The transaction agent 24 sorts through resources and events in order to recognize the application operations (transactions) that occur. This is done in two parts: recognizing the applications that are running, and recognizing the transactions that occur. As resources come into and go out of existence, the ruleset engine determines when an instance of a monitored application is running. In addition, once a running application instance is recognized (and only after it is recognized), the event streams from the application's resources are analyzed to recognize the transactions that occur.

Application Recognition

Application event object 34 is the basis for two special event objects, START and STOP, which signal resource availability. In particular, a START event from a given resource indicates that the resource is available and active, while a STOP event signals resource termination.

Figure 13:
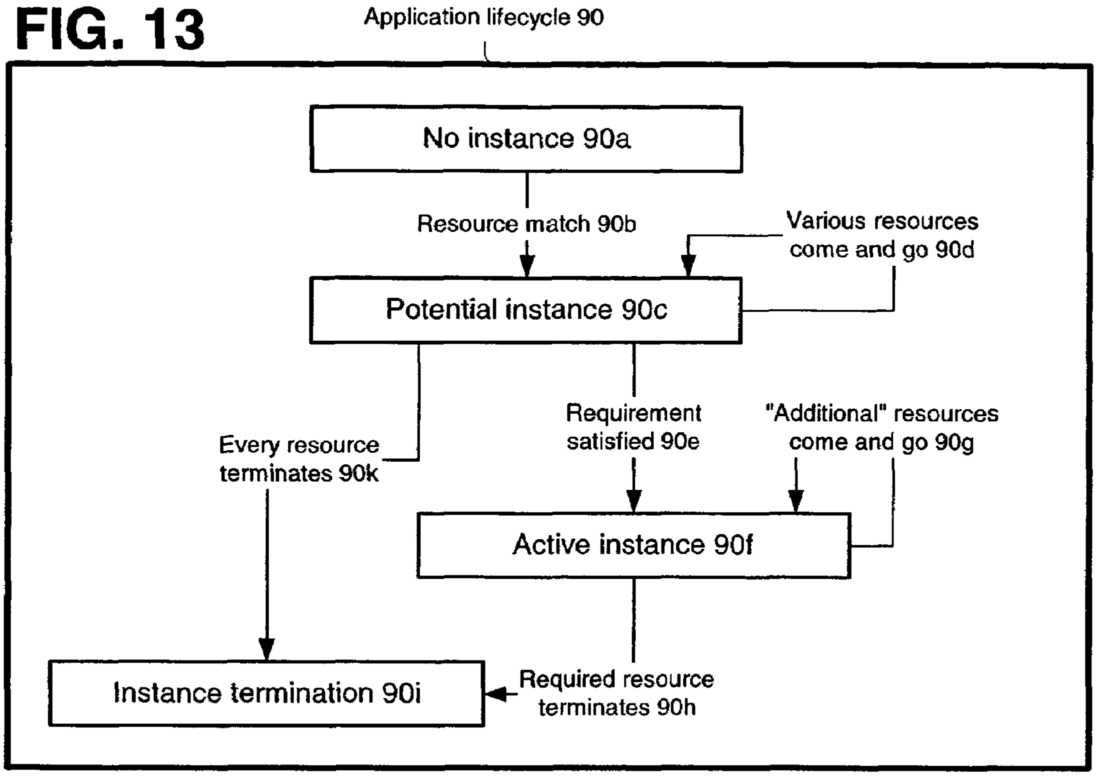
FIG. 13 illustrates an application lifecycle.

Referring to FIG. 13, an application lifecycle 90 describes stages of availability that an application instance 70 passes through. In the is case, availability is a function of resources. Broadly, as each resource 72 comes into existence, as signaled by its initial START event, the resource is matched against the definitions of all applications in its session 26. Both "required" and "additional" resource definitions are included in the comparison. The matching is subject to selection kinds 84*b* (FIG. 8A) of each resource definition, such as "one", "any", or "all". The matching is also subject to resource dependencies. For example, a Connection resource will not be added to an application instance unless the Process resource on which the connection depends is present.

When a sufficient set of "required" resource definitions have been matched (as indicated by the selection kind 84*b*), the application instance transitions from a potential instance to a recognized instance, and transaction recognition activity begins. Transaction recognition activity continues until the "required" resource definitions and qualifier are no longer satisfied, for example due to resource terminations as signaled by STOP events.

Application lifecycle 90 applies to a given application instance 70. Initially, the instance does not exist (stage 90*a*). A resource is recognized that does not match an existing resource—for example, perhaps user starts a second copy of a web browser (transition 90*b*). Transaction agent 24 creates an object for application instance 70, including a collection of resources. The resource is added to the collection. The application instance 70 is now in a "potential" state (stage 90*c*), between creation and full availability.

While the application instance 70 is in its potential state, resources come and go, with at least three possible results. One result is that the instance remains potential (transition 90*d*). For example, the application instance 70 may require three resources, only two of which are yet available. Another possible result is that all of the require resources become available, in which case the instance becomes (transition 90*e*) an active instance (stage 90*f*). A third possible result is that every resource in the collection of resources terminates, causing the instance to move (transition 90*k*) to a termination state (stage 90*i*). In this case, transaction agent 24 destroys the associated object. Such an instance is an example of a false start.

Once the instance is active (stage 90*f*), changes to its resources produce at least two possible outcomes. When resources defined to be "additional" terminate or become available, the instance remains active (transition 90*g*). However, when a required resource terminates, the instance also terminates, moving (transition 90*h*) to a termination state (stage 90*i*).

Transaction Recognition

Figure 14:
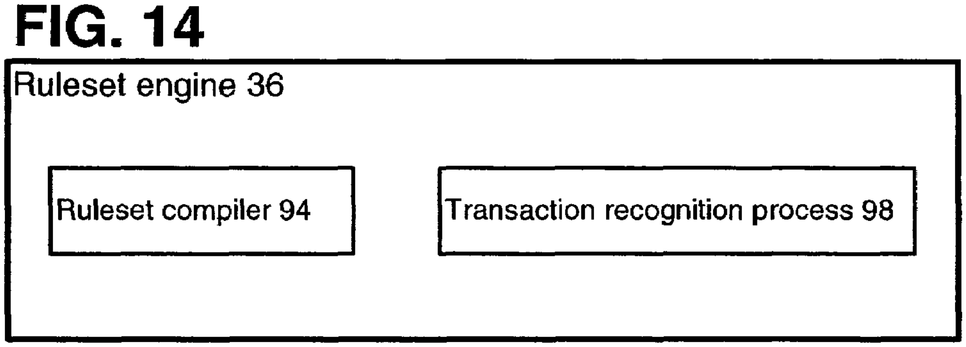
FIG. 14 is a block diagram of a ruleset engine.

Referring to FIG. 14, a ruleset engine 36 includes processes such as a ruleset compiler 94 and a transaction recognition process 98. In general, ruleset compiler 94 constructs a rule graph, which functions as a state machine, from a ruleset. Transaction recognition process 98 uses a rule graph to detect transactions within a stream of events. Upon detecting a transaction, transaction recognition process 98 sends a transaction event object 38 to monitor server 40.

Transaction event object 38 describes the transaction, the related application instance, the time and duration of the transaction, and additional event data describing stages within the transaction, along with time and duration for the stages as well. Transaction event object 38 also includes reporting data such as the module associated with the transaction.

Ruleset Compilation

Figure 15A:
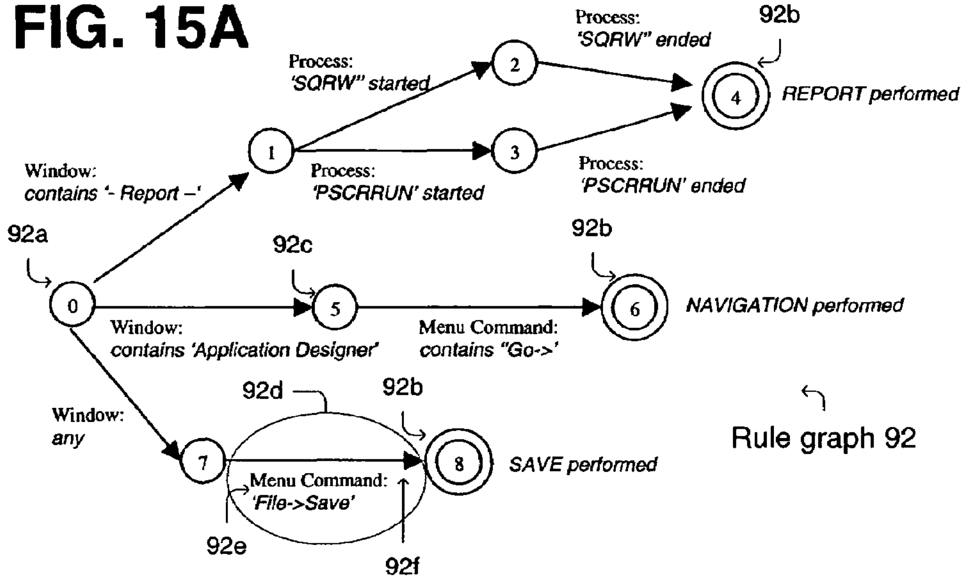
FIG. 15A is a diagram of a rule graph.

Referring to FIG. 15A, a rule graph 92 is an internal representation of the application's transaction rule definitions. Ruleset engine 36 uses a rule graph 92 to recognize transactions, maintaining a separate rule graph for each recognized application instance.

A rule graph for a ruleset has exactly one initial state 92*a* (state zero, labeled "0" in FIG. 15A), a separate terminal state 92*b* for each transaction rule for the ruleset, and zero or more intermediate states 92*c*. An arc 92*d* is a transition between states. An arc represents an atomic event specification 86*a* (FIG. 9B) within a transaction rule. Thus, each transition in rule graph 92 accepts a category of application events 34 (FIG. 1A). A series of transitions corresponds to a pattern of accepted events. In particular, a series of transitions from an initial state 92*a* to terminal state 92*b* corresponds to a pattern of events for a recognized transaction.

Each arc 92*d* has an arc condition 92*e* that characterizes the events that the transition accepts. Each arc 92*d* also has an arc direction 92*f* that specifies the transition from a source state for the arc to a destination state.

Figure 15B:
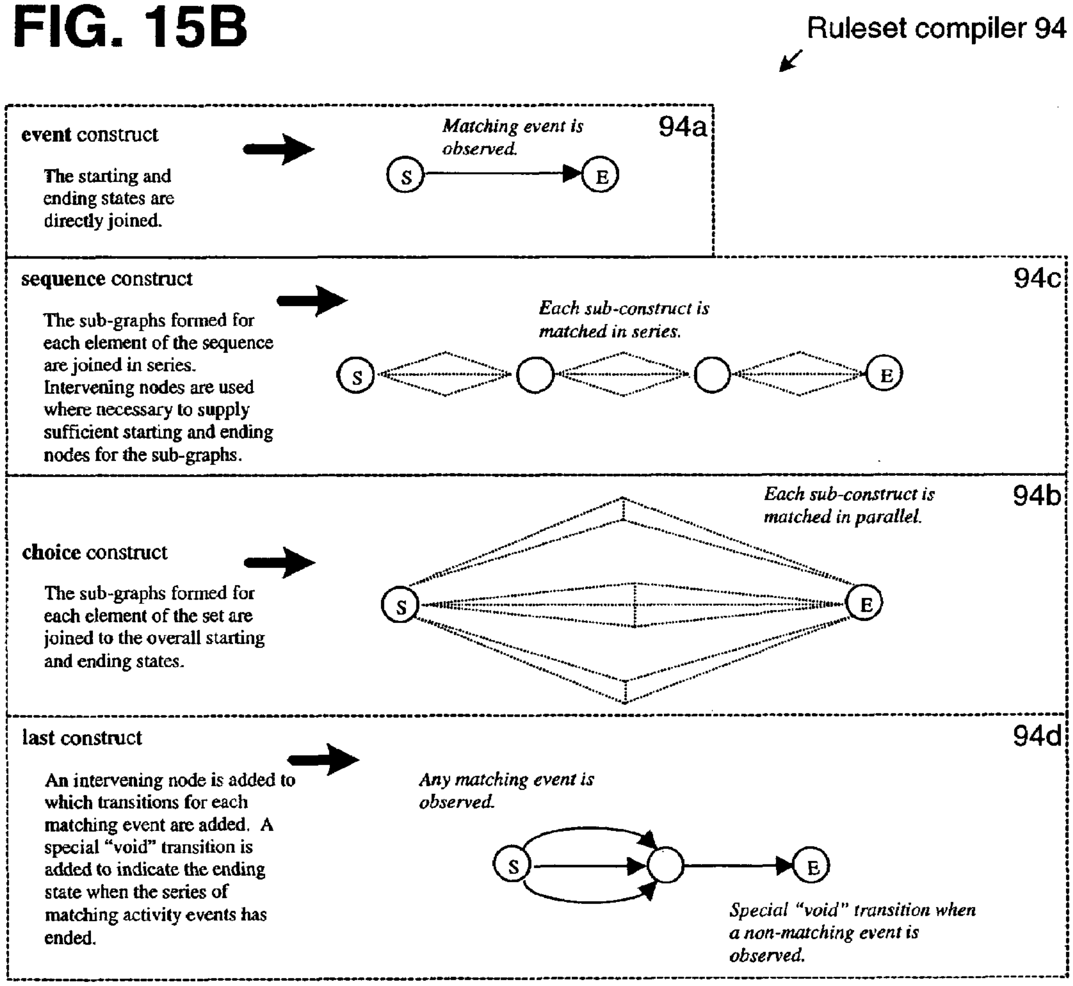
FIG. 15B is an illustration of a ruleset compiler.

Referring to FIG. 15B and FIG. 9A, a ruleset compiler 94 is a process that translates the transaction statements 20*c* of a ruleset 16 into a rule graph 92. Ruleset compiler 94 recursively processes the transaction statements. At each level in the recursion, ruleset compiler 94 selects starting and ending states, and adds appropriate intermediate states 92*c* and arcs 92*d* to reflect the syntactic constructs of the transaction statements.

For the top level of a transaction statement, the starting state is the initial state 92*a*, and the ending state is the terminal state 92*b* that represents the recognition of the transaction. Ruleset compiler 94 recursively processes the body of the transaction definition—i.e., the rule body block 86—using sub-processes specialized to the particular syntactical construction. These sub-processes include event translation 94*a*, choice translation 94*b*, sequence translation 94*c*, and last translation 94*d*. Each such sub-process receives a reference to a starting state, a reference to an ending state, and a syntactical construct of the ruleset (such as an atomic event specification 86_a_, shown in FIG. 9B; a choice construct 86_g_, shown in FIG. 9C; a sequence construct 86_h_, shown in FIG. 9D; or a last construct 86_i_, shown in FIG. 9E). Note that the notions of "starting state" and "ending state" are defined from the frame of reference of the sub-process; they are not static or universal, but can vary with each instance of the sub-process and its position within the recursion stack.

Event translation 94_a_ translates an atomic event specification 86_a_. Event translation 94_a_ creates an arc between the starting and ending states. The arc condition corresponds to the event source 86_d_, event kind 86_e_, and parameter list 88 of the event specification.

Choice translation 94_b_ translates a choice construct 86_g_. For each event specification in the choice construct, choice translation 94_b_ adds to rule graph 92 a separate subgraph between the starting and ending states. Choice translation 94_b_ recursively invokes sub-processes of ruleset compiler 94 to construct the subgraph as appropriate, depending on the type of event specification. For example, when the event specification is atomic, choice translation 94_b_ invokes event translation 94_a_, passing the same starting and ending states as were passed to choice translation 94_b_. When the event specification is a sequence construct (i.e., one nested inside the choice construct), choice translation 94_b_ invokes sequence translation 94_c_. The invoked sub-process can itself recurse, constructing subgraphs within subgraphs.

Sequence translation 94_c_ translates a sequence construct 86_h_. The sequence construct contains an interruptible series of event specifications. For each pair of adjacent event specifications in the series, sequence translation 94_c_ adds to rule graph 92 a separate subgraph, such that the subgraph connects adjacent states ordered like the adjacent event specifications. Similar to choice translation 94_b_, sequence translation 94_c_ recursively invokes sub-processes of ruleset compiler 94 to construct the subgraph as appropriate, depending on the type of event specification.

Recall that the main body of a transaction rule is an implicit sequence construct 86_g_ (FIG. 9C).

Last translation 94_d_ translates a last construct 86_i_. Last translation 94_d_ adds an intermediate state 92_c_ to the rule graph 92. The last construct 86_i_ contains an non-interruptible series of event specifications. For each event specification in the series, last translation 94_d_ adds a transition from the starting state to the new intermediate state. Last translation 94_d_ also adds a special "void" transition from the new intermediate state to the ending state, to indicate when the series of matching activity events has ended. The arc for the void transition has a special arc condition 92_e_ that requires no input. During processing, this void transition is not followed until all of the incoming transitions to the intermediate state have been satisfied.

Figure 15C:
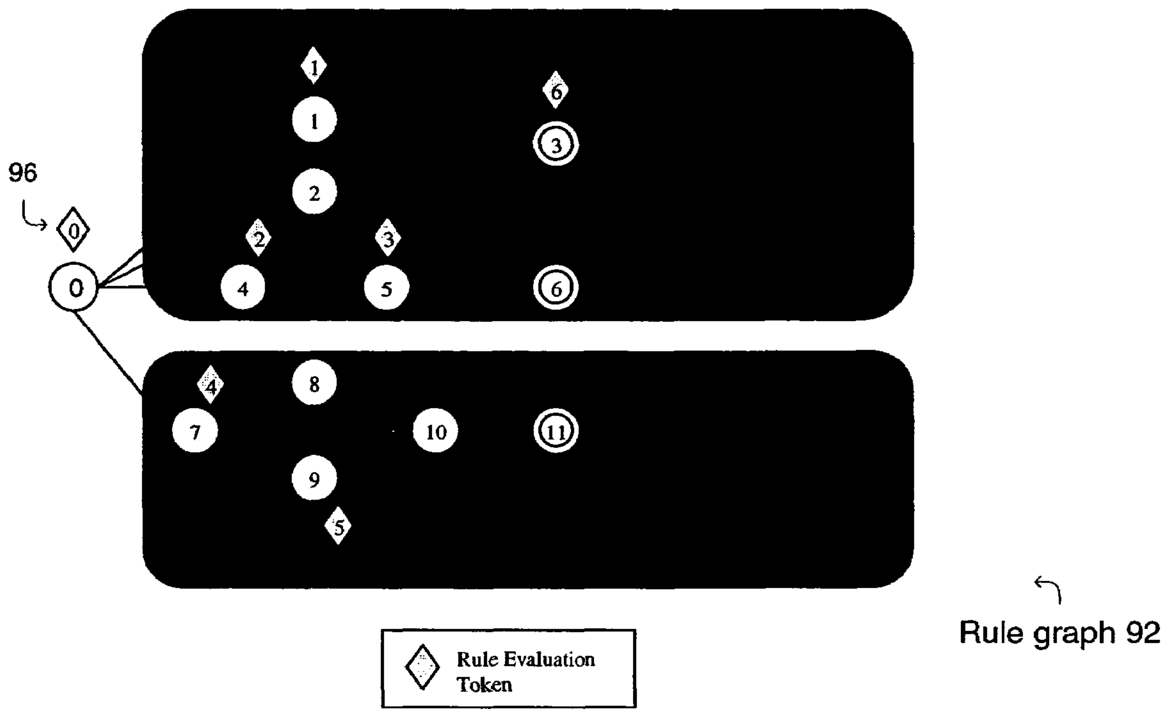
FIG. 15C is a diagram of a rule graph, with alternate rulesets and tokens.

Referring to FIG. 15C, ruleset compiler 94 compiles each transaction statement to begin at the same shared initial state 92_a_ and end at a distinct terminal state 92_b_, regardless of the alternate ruleset in which it is contained. The rule graph for an application may therefore contain a mix of sub-graphs (each corresponding to a transaction) from different alternate ruleset constructs. Each sub-graph is compiled with information about the identity of the alternate ruleset that contains it. Note that transaction definitions that occur outside of an explicit alternate ruleset construct are implicitly considered to be part of their own alternate ruleset (i.e. the "primary ruleset").

State Machine in Operation

Referring still to FIG. 15C, transaction recognition process 98 uses a rule graph 92 as a state machine to recognize transactions for an application instance 70 (FIG. 4). Transaction recognition process 98 associates tokens 96 with states of the rule graph. For simplicity of explanation, this discussion often refers to a token being "placed on" a state to indicate this association with a state, using a physical metaphor for the rule graph. It should be understood that in practice, rule graph 92 is a data structure in the memory of a computing device.

A token 96 represents the progress of a path through the rule graph, from the initial state 92. The path corresponds to a recognized series of events. When a token is placed on a terminal state 92_b_, the path represents a series of events that satisfies a transaction. Multiple tokens can be placed on the same rule graph at once, allowing the ruleset engine to track multiple paths simultaneously. In FIG. 15C, tokens 96 are illustrated as numbered diamonds, while states of the rule graph 92 are numbered circles.

Figure 16:
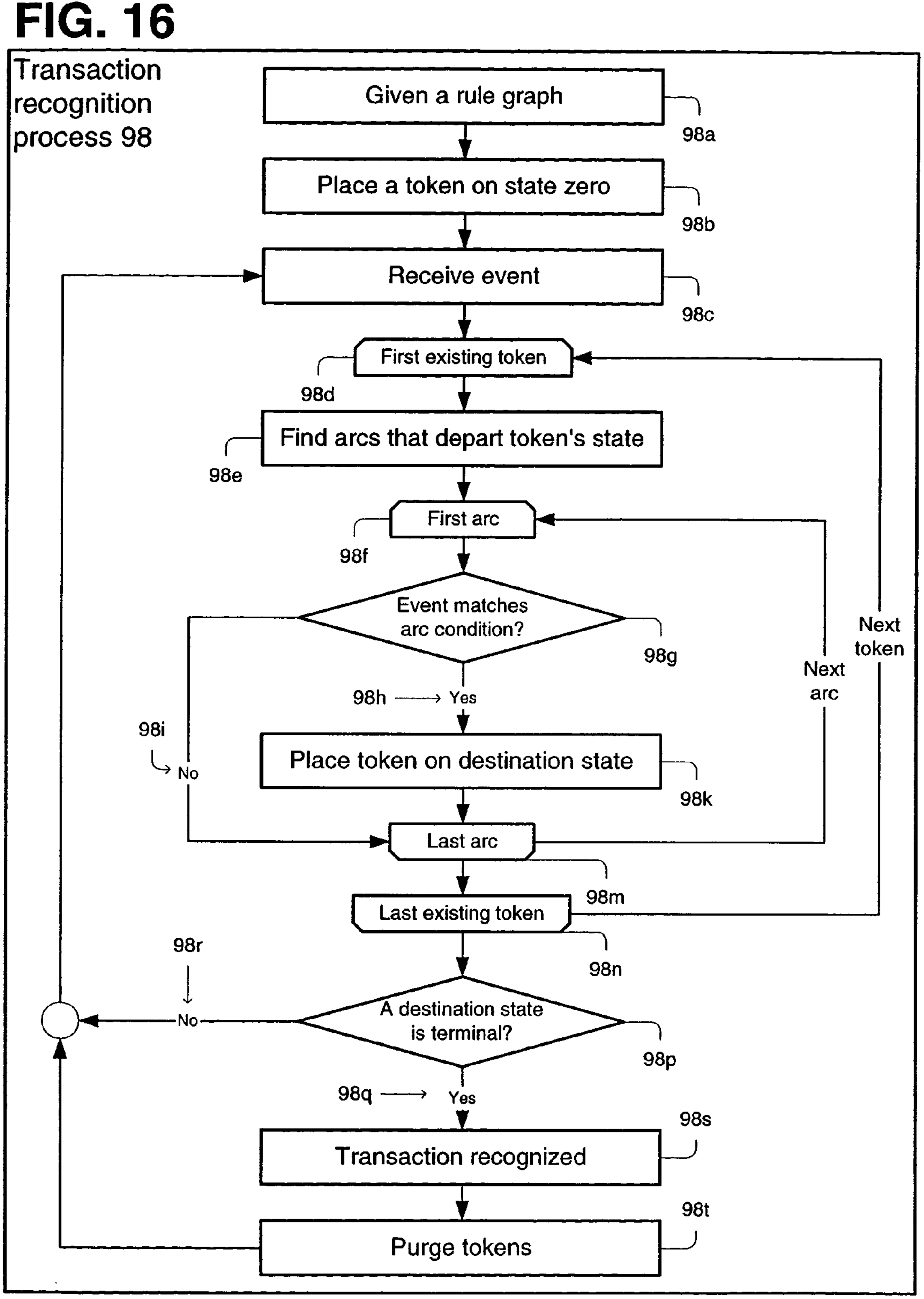
FIG. 16 is a flowchart of a transaction recognition process.

Referring to FIG. 16, transaction recognition process 98 has a rule graph to operate on (step 98_a_). Transaction recognition process 98 places a single token 96 on state zero of the graph (step 98_b_). As application event objects 34 are received (step 98_c_), transaction recognition process 98 evaluates the tokens currently on the rule graph (loop beginning at 98_d_ and iterating through 98_n_). For each such token, transaction recognition process 98 considers each of the arcs that depart it (step 98_e_, and loop at 98_f_ through 98_m_). If the event matches the condition of the arc (result 98_h_ of step 98_g_), transaction recognition process 98 adds a new token to the destination state of the arc (step 98_k_). Otherwise (result 98_i_ of step 98_g_), transaction recognition process 98 continues to loop through arcs for the current token (step 98_m_).

Note that the current token is not normally moved, but a new token is added to the destination state. One reason for this is that the new state may represent a dead-end path, i.e., a transaction that whose pattern is partially matched to the current event stream but which ultimately fails to match. Transaction recognition process 98 leaves original tokens in place as a historical record, to continue evaluating other alternative paths through the graph.

If multiple tokens are added to the same state of the graph, then transaction recognition process 98 discards all but the one representing the potential transaction with the most recent starting time. A later section entitled "TRANSACTION SELECTION" gives further information about tie-breaking procedures in transaction recognition process 98, below.

After adding new tokens, transaction recognition process 98 tests whether any of the destination states is a terminal state (step 98_p_). For each such terminal state found (result 98_q_), transaction recognition process 98 considers the corresponding transaction recognized (step 98_s_). Otherwise, if no tokens were newly placed on terminal states (result 98_r_ of step 98_p_), transaction recognition process 98 loops back to process the next event (step 98_c_).

If terminal states are reached for transactions from different alternate ruleset constructs, then transaction recognition process 98 selects a single transaction for reporting from each of the alternate ruleset constructs.

Once a transaction (or set of transactions) is recognized, transaction recognition process 98 purges outstanding tokens from the rule graph (step 98_t_), then begins anew to look for the next transaction (step 98_b_). The purging of outstanding tokens includes the following operations. For the token located on the initial state, transaction recognition process 98 leaves the token in place. Tokens that have reached terminal states (i.e. recognized transactions) are removed. Tokens located on intermediate states may either be preserved or removed, as follows.

Tokens from a subgraph that represents an alternate ruleset construct in which a transaction was recognized are generally removed from the rule graph. One exception is that tokens just created as a result of transitions from the initial state are preserved. This allows an application activity event that ends a transaction occurrence to also serve as the first event of a new transaction (e.g. window-to-window transitions).

Tokens from other alternate ruleset constructs, in which no transaction was just recognized, are also preserved during purging 98*t*. Thus, transaction recognition process 98 evaluates transaction rules from different alternate ruleset constructs independently of each another.

Referring again to FIG. 15C, an example rule graph 92 includes an upper and a lower alternate ruleset. Several tokens 96 have been placed on the rule graph, reflecting a series of events that has led transaction recognition process 98 to recognize transaction A (as indicated by the presence of token 6 on state 3). After the recognition of this transaction, all of the tokens for the upper alternate ruleset will be removed (i.e. tokens 1, 2, 3, and 6). However, all of the tokens for alternate ruleset 1 will remain in place (i.e. tokens 4 and 5). Transaction C can be recognized in as little as two more events—namely, an event that places a token on step 10, followed by an event that places a token on step 11.

Transaction Selection

It is possible for multiple transactions to be recognized simultaneously as a result of processing a single application activity event. This could be the result of alternate ruleset definitions or of ambiguous transaction rules. When multiple transactions from the same alternate ruleset are recognized, transaction recognition process 98 applies a tie-breaking algorithm to select a single transaction for reporting. First, transaction recognition process 98 discards transactions older than a predetermined threshold. This avoids mixing and matching events from different real transaction occurrences. Next, transaction recognition process 98 gives first preference to the transaction with the most recent starting time. Earlier starting times may represent transactions that were cancelled, and that now only appear to be completing due a mixing of events with the newer transaction occurrence. Third, if two or more transactions share the most recent starting time, transaction recognition process 98 gives preference to the transaction with the most specific transaction rule definition, i.e., the rule with the most state transitions.

By reporting only one of the transactions, transaction recognition process 98 avoids "double-counting" problems. Moreover, this serves as a mechanism to reset the engine and purge the states of incompletely recognized transactions, such as transactions that were not really occurring or were cancelled.

Handling the "Last" Construct

The "last" language construct requires special handling, since the last matching activity event of a series is not known until the subsequent (non-matching) event is received. First, transaction recognition process 98 forms a list of the token transitions that apply to the new event, but does not perform those transitions immediately. Then, if the final event of a series occurred for a "last" construct, transaction recognition process 98 transitions the corresponding token from the intervening state to the final state for the construct. From there, transitions may apply for the new activity event. Finally, transaction recognition process 98 performs all token transitions that match the new activity event.

When the series of matching events has ceased, the single token on the intervening event is copied to the destination state indicated by the special "void" transition and the token on the intervening state is removed. Unlike other transitions, the original token is removed in this case because it cannot represent an alternate evaluation path in the rule graph (i.e., there cannot be another last event in the series).

Object Identifiers

Referring again to FIG. 1A, terminal agent 22 includes a Windows hook 28 that monitors an event source of a Microsoft Windows operating system 13 on client device. Windows hook enables terminal agent 22 to monitor events in a Windows messaging stream exposed by the operating system. The messaging stream contains raw application events 46 (FIG. 1B) generated by GUI objects such as windows, menus, buttons, and other controls.

For example, when a user clicks on a button in a window, the operating system adds an event 46 describing the click to the stream. The event 46 includes information about the button, which in the Microsoft Windows model is a form of window. The button has a parent window—perhaps a dialog of a larger application. In this case, the button's parent (the dialog) has a parent of its own (the application window). This chain of parentage forms an object hierarchy for the session, back to some root window object. Every active window object (including controls) has a place within an object hierarchy.

As another example, a raw application event 46 in the Windows messaging stream could represent a window being opened or moving "to the front", i.e., receiving focus. In other words, the messaging stream also includes events that are not tied to user interactions.

Windows hook 28 uses a naming scheme for GUI objects within the Windows object model. The naming scheme helps Windows hook 28 detect similar GUI objects over time. For example, a data entry application might have a form to collect user input. The form includes a save button for saving the form to a database. A different dialog in the application would alert the user that the data saved successfully. The form, the save button, and the dialog would each have a distinct object identifier under the naming scheme. Moreover, when the user opened the form again to submit new data, the second instance of the form—and its accompanying second instance of the save button—would each have object identifiers that matched the first instances. Thus, the object identifiers allow terminal agent 22 to detect recurrent instances of GUI objects. Among other uses, object identifiers offer one way that rulesets 16 can select a particular GUI object—such as form or button—in the rules that characterize transactions.

The name assigned to each GUI object is based in part on stylistic properties of the object and on the object's position within the hierarchy of GUI objects active in the current session. The naming scheme includes a syntax and a process for generating names according to the syntax. In general, the naming scheme has sufficient specificity that, within a given session 26 at a given moment, the scheme uniquely identifies each object. The naming scheme also has sufficient generality over time that when a GUI object comes into being within the session, expires, and later recurs in a second instance, the scheme assigns the same name to both instances of the GUI object. This combination of specificity and generality allows the naming scheme to identify recurrent instances of a GUI object over time.

The naming scheme is based on data that is dynamically available as properties of a raw application event 46 (FIG. 1B) as it exists natively within the Windows messaging stream. The naming scheme identifies a GUI object without, for instance, requiring pre-existing information about the class libraries that define the object.

The naming scheme for GUI objects is also independent of the human-readable titles that are associated with GUI objects for display. One benefit of this is that a GUI object can be dynamically re-titled (for example, to incorporate the name of a newly-opened file in the title of a window for a word processor application) without affecting the object's identity within the scheme. Also, the scheme is portable between internationally localized versions of the Microsoft Windows. For example, moving from an English version to a French version of Windows would not alter the object identifiers.

Also, the naming scheme is independent of the GUID (globally unique identifier) of windows objects. When a second instance of a window or control recurs after a first instance, the two instances have different GUID's. The GUID's in themselves do not give the two instances a common identifier.

Figure 17A:
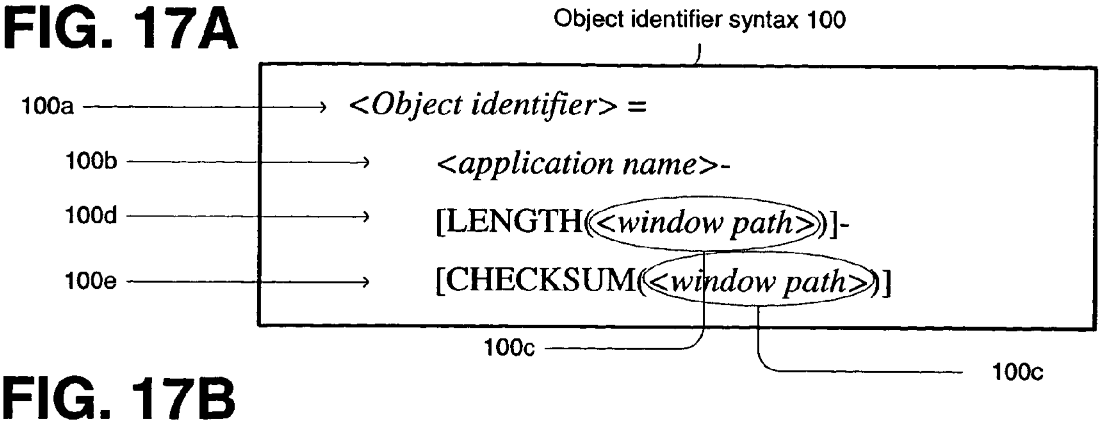
FIG. 17A is a syntax for an object identifier.

Referring to FIG. 17A, Windows hook 28 employs an object identifier syntax 100 in its naming scheme for GUI objects. Object identifier syntax 100 specifies the format of an OID (object identifier) tag 100*a*, which is an instance of a name within the naming scheme.

OID tag 100*a* includes an application name 100*b* and properties of a window path 100*c*, such as a length 100*d* and a checksum 100*e*. Application name 100*b* is a property of a GUI object as it exists natively within the Microsoft Windows object model, wherein each GUI object is affiliated with an application instance 70 (FIG. 3A). Window path 100*c* is a text string, discussed with regard to FIG. 17B. Length 100*d* expresses the number of characters in window path 100*c*. Checksum 100*e* is a numeric hash of the text of window path 100*c*, for example into approximately ten digits. OID tag 100*a* includes a concatenation of application name 100*b*, length 100*d*, and checksum 100*e*, separated by hyphens.

Figure 17B:
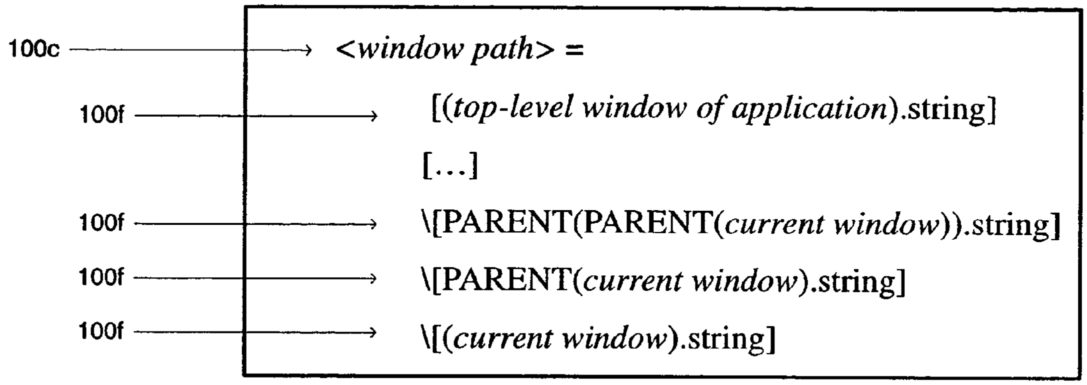
FIG. 17B is a syntax for a window path.

Referring to FIG. 17B, window path 100*c* is a text string generated from properties of a GUI object native to the Microsoft Windows GUI object model. In particular, window path 100*c* is a concatenated list of derived string properties 100*f*. The list reflects the position of the GUI object within the object hierarchy for the session discussed above. The list includes an entry for the GUI object in question, as well as an additional entry for each of the object's ancestors within the object hierarchy. A backslash character ("\") is the list delimiter.

Figure 17C:
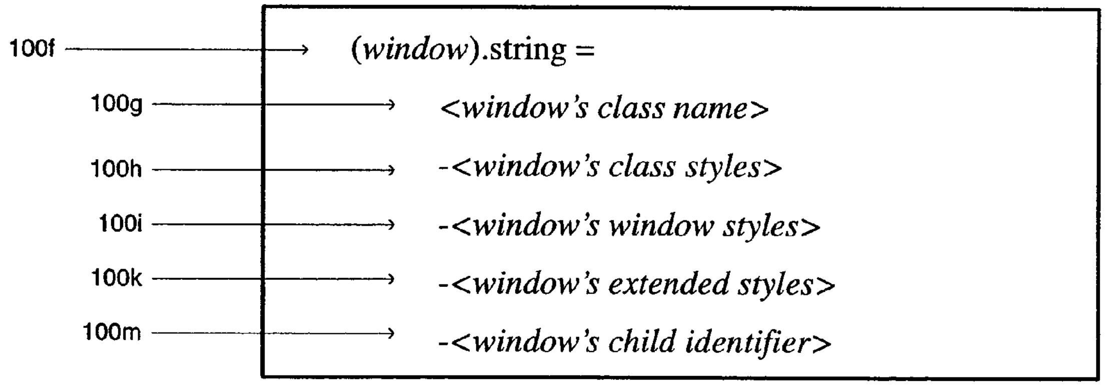
FIG. 17C is a syntax for a string property of a window.

Referring to FIG. 17C, a derived string property 100*f* for a GUI object (which is a window object in Microsoft parlance) includes a class name 100*g*, a list of class styles 100*h*, a list of window styles 100*i*, a list of extended styles 100*k*, and a child identifier 100. These components of derived string property 100*f* are concatenated together, delimited by hyphens. They are available as properties of the raw application event 46 associated with the window object in the Windows messaging stream. In general, class name 100*g* specifies an object class for the window object, while class styles 100*h*, window styles 100*i*, and extended styles 100*k* are hexadecimal parameter values that affect the particular visual presentation of the window object, according to conventions of the Microsoft Windows GUI. (For example, two related dialogs, one modal and one not, might share the same class name 100*g* but differ in their style parameters.) Child identifier 100*m* distinguishes the window object from "sibling" window objects that have the same parent object. The child identifier is Microsoft Windows convention. Within the scope of a given parent window, each child window is uniquely identified by its child identifier.

Note that in practice, dynamic styles are excluded from class styles 100*h*, window styles 100*i*, and extended styles 100*k*. By forming OID tags 100*a* that are independent of dynamic styles, matches are more likely between different instances of similar objects over time. Different instances of a similar window can vary in their dynamic styles without affecting the object identifier that the naming scheme assigns.

For the most part, the naming scheme has sufficient specificity that, within a given session 26 at a given moment, the scheme uniquely identifies each object. However, one exception to this specificity occurs for objects from simultaneous similar application instances, i.e., ones that share the same application profile. For example, the main window for each instance will have the same application name 100*b* and window path 100*c*. Thus, each instance will have the same object identifier value.

Here is an example of an application name 100*b* and window path 100*c:*

MSDEV-\"(AfxWndClass)"-8-cf0000-100-0\"(AfxWndClass)"-8-40000000-0-3ea\"(AfxWndClass)"-8-40800000-0-7310\"(AfxWndClass)"-8-40000000-0-7310\"(AfxWndClass)"-8-4000000-200-0

The application name has the value MSDEV. The text between the first two backslashes in the example is the derived string property 100*f* of a top window: "(AfxWndClass)"-8-cf0000-100-0. This parses into a value of "(AfxWndClass)" [the quote characters are part of the value] for class name, a value of 8 for class style, a value of cf0000 for window styles, a value of 100 for extended styles, and a value of 0 for child identifier. The text contains derived string properties for four other windows. The corresponding OID tag 100*a* is:

MSDEV-165-1322699925

In this example, the value 165 is the length of the window path, while the value 1322699925 is the checksum.

Figure 18:
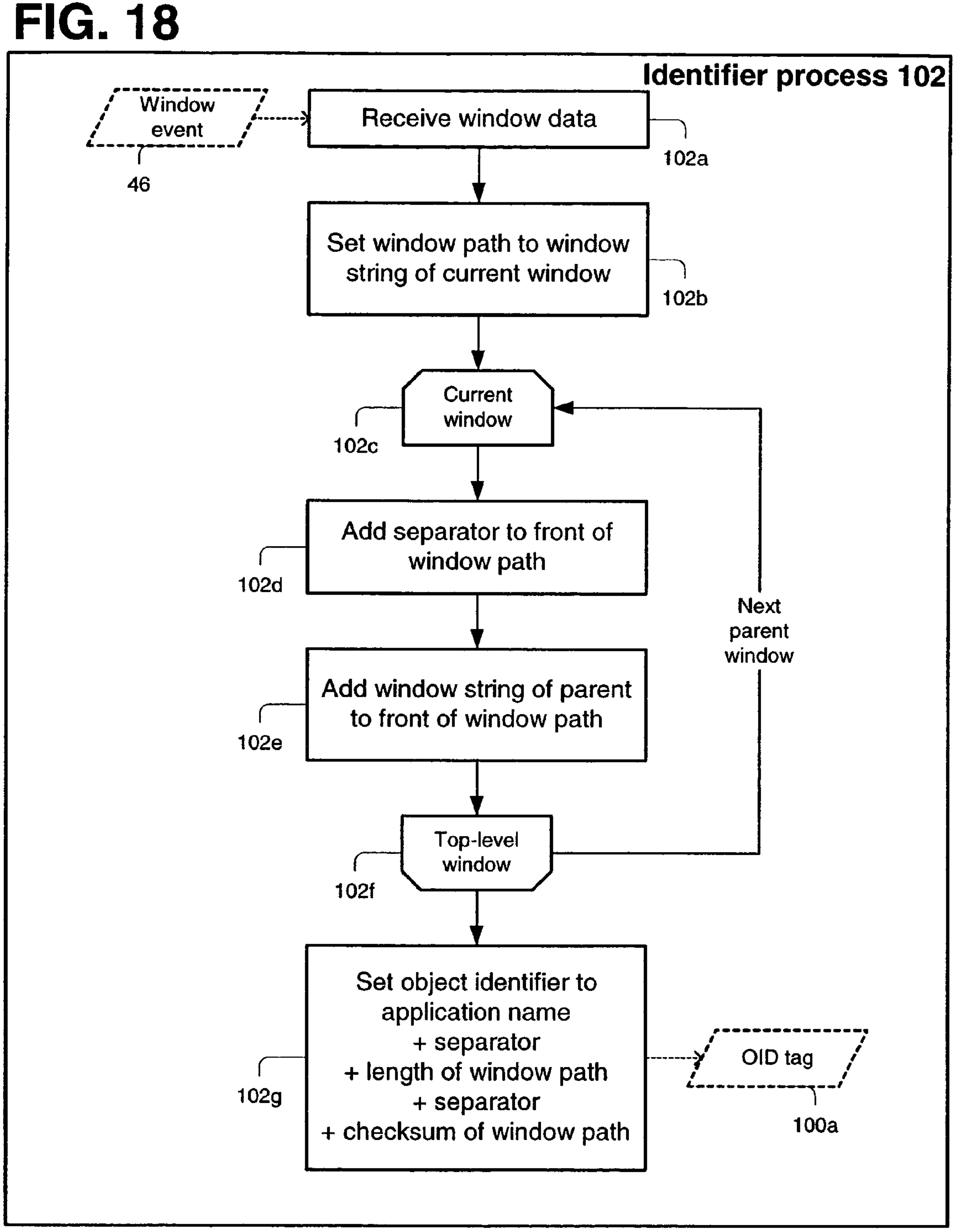
FIG. 18 is a flowchart of an identifier process.

Referring to FIG. 18, Windows hook 28 uses an identifier process 102 to generate an OID tag 100*a* for a window object described by a raw application event 46. Windows hook 28 detects the event 46 in the Microsoft Windows messaging stream.

Identifier process 102 receives a reference to a window object described by a raw application event 46 (step 102*a*). This window object will be referred to as the "base" window object, as distinct from its parent objects in the object hierarchy. Identifier process 102 creates a window path 100*c* for the base window object, beginning with a derived string property 100*f* for the base window object (step 102*b*). Identifier process 102 iterates up the object hierarchy to the root window object (loop at step 102 through 102*f*). For each successive parent, identifier process 102 adds a hyphen delimiter (step 102*d*) and a derived string property 100*f* for the current parent window (step 102*e*) to the front of the window path text. Dynamic styles are excluded from derived string properties 100*f* in steps 102*b* and 102*e*.

After identifier process 102 finishes iterating, window path 100*c* is complete. Identifier process 102 calculates the length 100*d* of the window path 100*c* and a checksum 100*e*, then forms an OID tag 100*a* according to object identifier syntax 100 (step 102*g*).

Studio Application

Figure 19A:
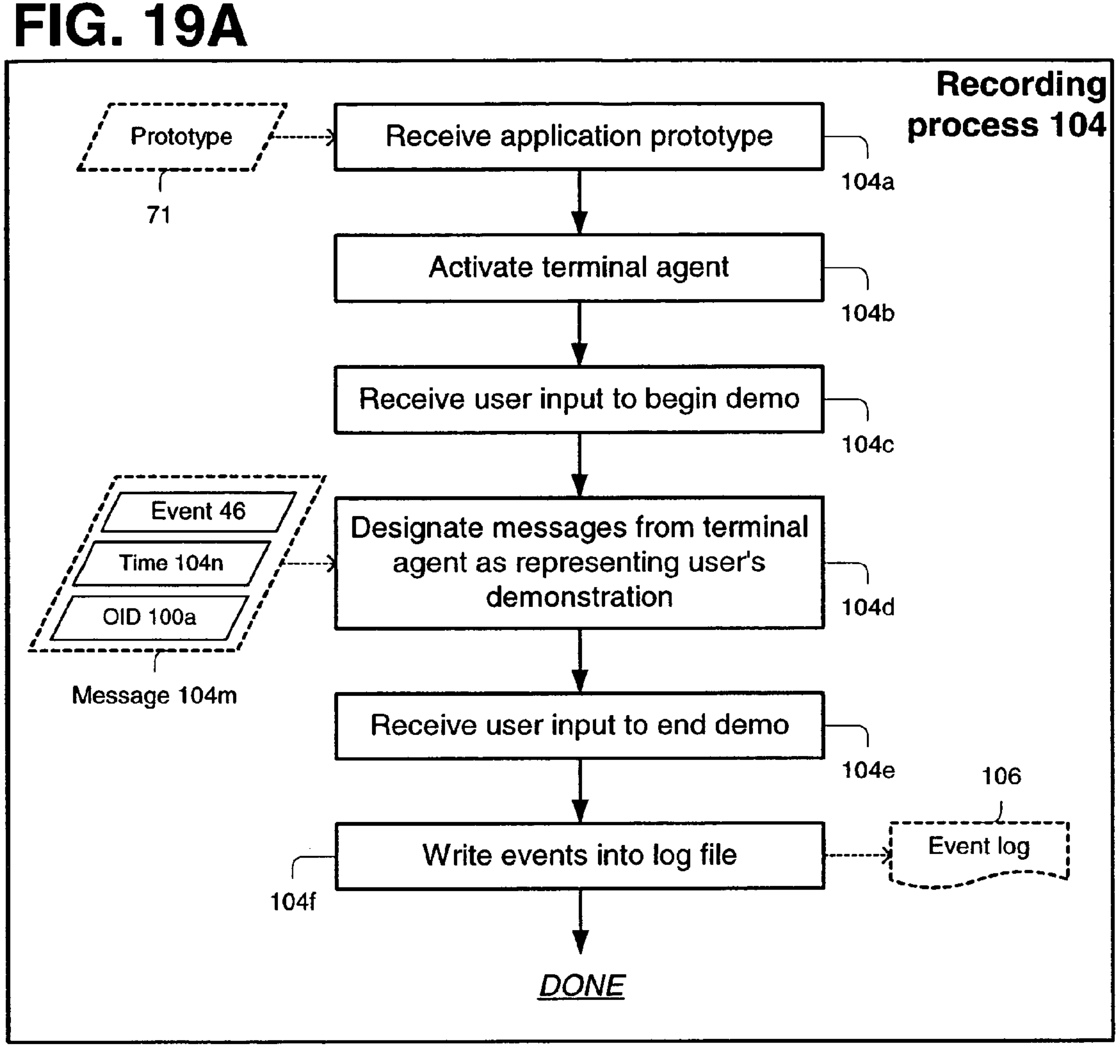
FIG. 19A is a flowchart of a recording process.
Figure 19B:
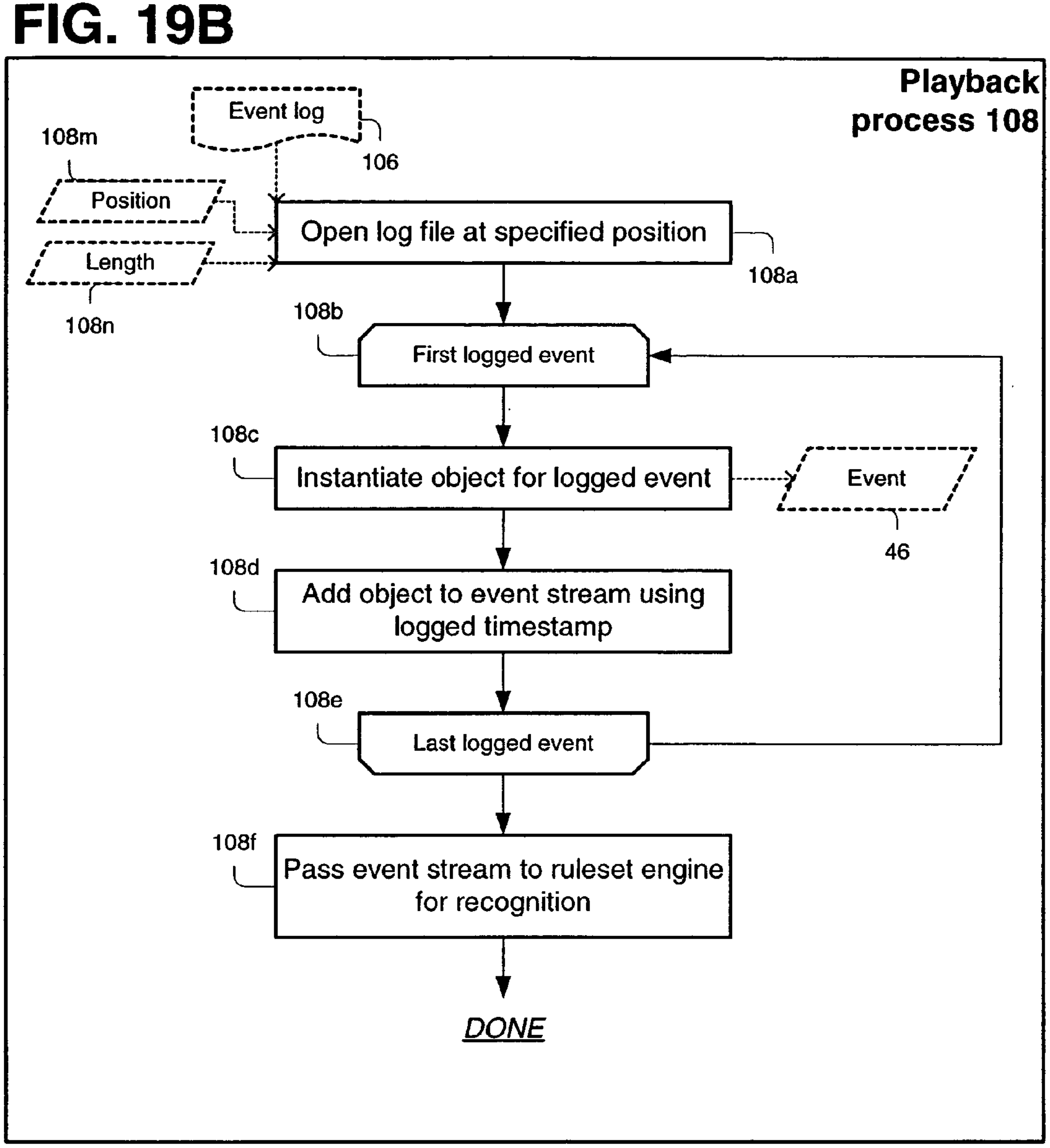
FIG. 19B is a flowchart of a playback process.
Figure 19C:
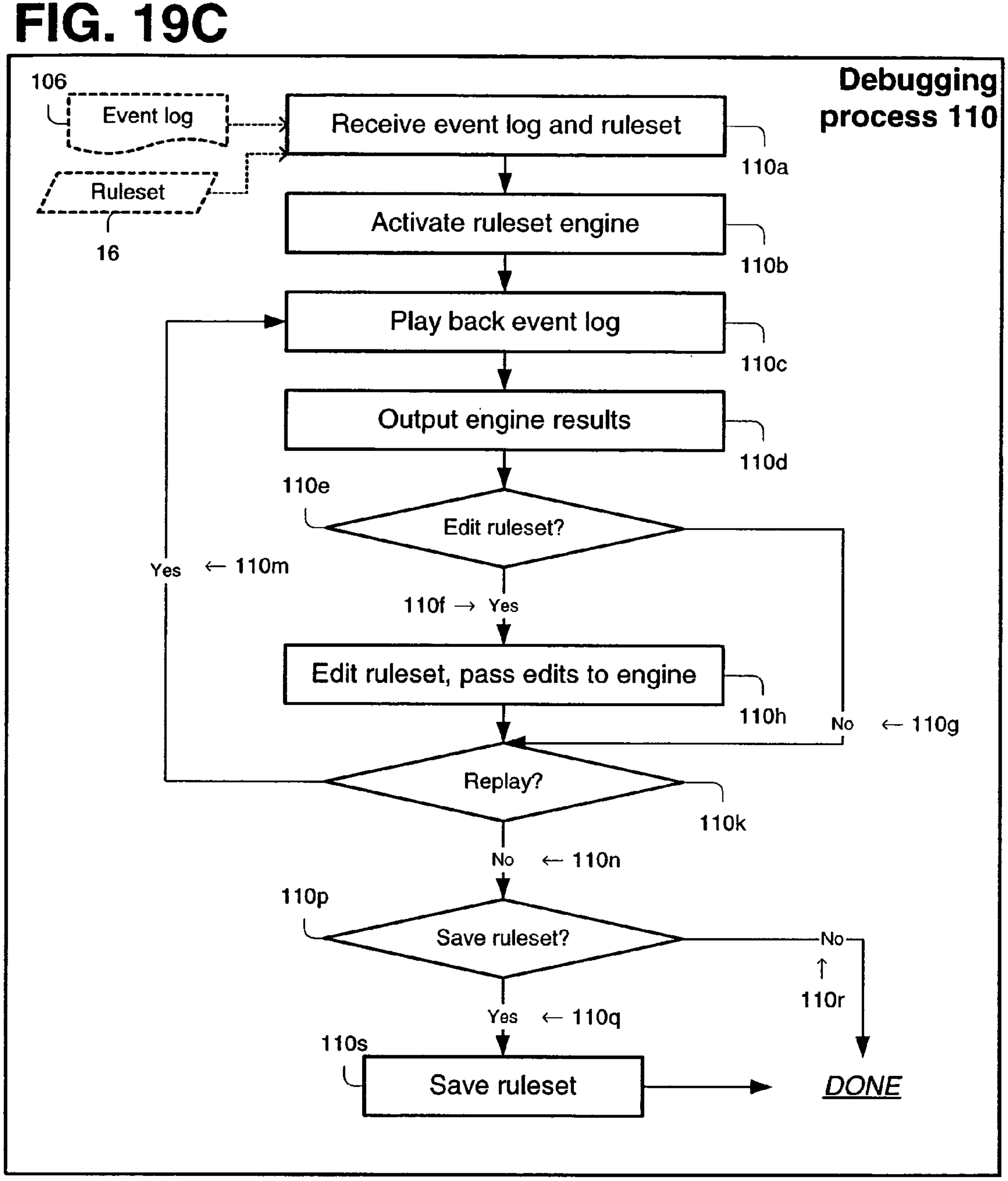
FIG. 19C is a flowchart of a debugging process.

Referring to FIGS. 19A–19C, broadly, studio application 18 is a software tool for use by administrators 14*a* (FIG. 1A) in developing rulesets 16 that characterize transactions. Studio application 18 includes a recording process 104, which allows an administrator to put studio application 18 into a recording mode while the administrator interacts with applications—for example, carrying out actions that are representative of a transaction. While in the recording mode, studio application 18 captures raw application events 46 that describe real-time user interaction with application instances 70 and saves a script of the events into an event log 106. The script includes timestamps that locate each event in time. A playback process 108 can play the event log back.

Studio application 18 also provides a debugging process 110 that guides a user through a repeated cycle of testing a ruleset, inspecting the results, and editing the ruleset. Studio application 18 allows the administrator to replay a scripted series of events from an event log repeatedly and identically, producing the same events and timings on each playback. This repeatable playback provides a testing environment in which multiple recognition attempts, based on the ruleset, can each be tested against identical inputs, eliminating uncertainty due to changing or differently-timed user input. Furthermore, once such a script is recorded, repeatable playback automates the process of providing input to the recognition engine, which can save considerable human effort during the iterative development of a ruleset.

Referring to FIG. 19A, initially, a recording process 104 receives one or more application prototypes 71 (FIG. 4) describing application instances 70 to monitor (step 104*a*). Recording process 104 activates terminal agent 22 (FIG. 1A), which gathers raw application events 46 from the resources associated with the application prototypes 71, and arranges for terminal agent 22 to pass such events to recording process 104 (step 104*b*). For example, recording process 104 registers a recipient object with terminal agent 22 as a consumer of message objects 104*m* that reference the raw application events 46. In software terms, the message objects are a derived class of the raw application event class, enabling them to be used in place of standard raw application events 46. That is, message objects 104*m* implement a raw application event interface. Message objects 104*m* also contain additional data such as a timestamp 104*n* and, when applicable, an OID tag 100*a* for the GUI object associated with the raw application event 46. As part of the activation process (step 104*b*), recording process 104 also instructs terminal agent 22 to monitor the application prototypes 71, which characterize resources 72 (FIG. 4) to focus on. Thus, terminal agent 22 only forwards events to recording process 104 that are appropriate to the application prototypes 71.

Next, recording process 104 waits until receiving user input to begin a demonstration time period, which is a time in which the user can demonstrate interactions to be recorded (step 104*c*). For example, recording process 104 presents the user with a button to click in the GUI, indicating the beginning of the demonstration.

Recording process 104 concludes the demonstration time period upon receiving user input to that effect (step 104*e*). For example, recording process 104 presents the user with a button to click in the GUI to indicate the end of the demonstration. In the interim between steps 104*c* and 104*e*, recording process 104 designates message objects 104*m* from terminal agent 22 for recording (step 104*d*). Recording process 104 writes the designated message objects 104*m* into an event log 106 in chronological order (step 104*f*), then ends.

Referring to FIG. 19B, initially, a playback process 108 opens an event log 106, which contains a series of text-formatted translations of message objects 104*m* (step 108*a*). Each message object 104*m* includes a raw application event interface and a timestamp 104*n*. When the raw application event originates from a GUI object, the message object also includes an OID tag 100*a*.

Playback process 108 opens event log 106 at specified position 108*m* in the series of log entries. By default, the opening position is the beginning of the series.

Playback process 108 loops through the event log, from the first translation of a message object 104*m* (step 108*b*) to the last (step 108*e*). The last position is given by length 108*n*, which is an offset from position 108*m*. By default, length 108*n* is the full length of the series. For each translation, playback process 108 instantiates a raw application event object 46 (step 108*c*) and adds the event object to an event stream, using the timestamp 104*n* (step 108*d*). More specifically, playback process 108 instantiates an object that implements an interface that acts as raw application event 46.

Playback process 108 directs the stream of instantiated events to a ruleset engine 36 (FIG. 1A) for recognition (step 108*f*). When all logged events have been added to the stream, playback process 108 terminates.

Referring to FIG. 19C, a debugging process 110 takes an event log 106 and a ruleset 16 as input (step 110*a*). Debugging process 110 activates a ruleset engine 36 (FIG. 1A) and passes it the ruleset (step 110*b*). Debugging process 110 then uses playback process 108 to play back the event log (step 110*c*). Depending upon configurations and user input, debugging process 110 can play back the entire event log or just a portion. Playback process 108 derives an event stream from the event log and directs the stream to ruleset engine 36 configured with ruleset 16.

Debugging process 110 outputs results from ruleset engine 36 of the playback of the event log, such as the recognition of (or failure to recognize) a transaction (step 110*d*). In particular, when event log 106 contains a pattern of events that demonstrates a known transaction 80, the results output of step 110*d* indicates whether the ruleset 16 causes ruleset engine 36 to recognize the known transaction. In this case, the results of step 110*d* indicate the accuracy of the ruleset 16 at recognizing the demonstrated transaction. Alternatively, when ruleset 16 encodes a set of rules that are known to cause ruleset engine 36 to recognize a certain transaction, the results output of step 110*d* indicates whether the event log contains a pattern of events that satisfy the transaction.

Debugging process 110 decides whether to edit ruleset 16 by soliciting input from a user (step 110*e*). If the ruleset is to be edited (result 110*f*), the debugging process provides a user interface, such as a text editing window, for the user to make changes to the ruleset (step 110*h*). The user interface includes a control, such as a button, for the user to indicate the changes are complete, at which point debugging process 110 passes the updated ruleset 16 to ruleset engine 36. Otherwise, if the user declines to edit the ruleset (result 110*g*), the debugging process bypasses the editing step 110*h*.

Debugging process 110 next decides whether to perform another playback of the event log, again by soliciting user input (step 110*k*). If the user chooses playback (result 110*m*), the debugging process loops back to step 110*c* to play at least a portion of the event log using playback process 108 against ruleset engine 36. This allows the user to iterate repeatedly through a cycle of playing a recorded event log, inspecting the results, and modifying the ruleset, for example to improve the ruleset engine's recognition of a transaction demonstrated in the event log.

If the user declines playback (result 110*n*), the debugging process decides whether to save ruleset 16 after soliciting user input (step 110*p*). If the user chooses (result 110*q*), the debugging process saves the ruleset, i.e., commits any changes (step 110*s*) before ending; otherwise (result 110*r*), debugging process ends without saving the ruleset.

Naming Service and Proxy

Referring to FIG. 1A, monitor server 40 maintains a logical network address, such as an IP address, for each known transaction agent 24. Monitor server 40 uses the logical network address to communicate with transaction agent 24, for example to manage the configuration of transaction agent 24. Monitor server 40 can also use the logical network address when analyzing performance data associated with transaction agent 24, for instance to correlate responsiveness data reported by transaction agent 24 with network performance data. The logical network address can help identify the transaction agent 24 with network elements such as a logical or physical path in the network, or with other network elements such as a router or switch.

Monitor server 40 often maintains contact with a transaction agent 24 over continuous timeframes of several days. Over such periods, the logical network address, such as an IP address, of the transaction agent can change. For example, when the configuration of network 52 allows, transaction agent can acquire its IP address via a DHCP (Dynamic Host Configuration Protocol) lease. DHCP is a protocol that allows a node on an IP network to acquire an IP address dynamically, for example from a shared pool of IP addresses, none of which is permanently allocated to nodes. A DHCP server process allocates an IP address to the node using a lease, which specifies a time period during which the allocation is valid. The lease often includes an expiration time, for example 24 or 48 hours after the lease is initiated, depending on the particular policy chosen by network administrators. Under some implementations of DHCP, once the lease expires, a node can renew the lease and retain its IP address, but under other implementations, renewals are not necessarily guaranteed. That is, the request for a renewal can in some cases be denied, resulting instead in the node receiving a lease on a different IP address. Also, again depending again on network policy and implementations, a node that reboots can lose its lease on its logical address. Thus, monitor server 40 can encounter situations in which the logical network address it has been maintaining for a transaction agent 24 becomes invalid or obsolete. Furthermore, although technologies exist for resolving other logical addressing schemes to IP addressing, such as DNS (Domain Name System) or WINS (Windows Internet Naming Service), in the general case, it is possible that such services will not be installed on network 52, or will be inoperative. Moreover, some such technologies (for instance, WINS) are specific to particular operating systems or network protocols, and thus have classes of clients to which they do not extend (for instance, UNIX).

When active, transaction agent 24 gathers batches of updates to send to monitor server 40 and transmits the batches at a minimum rate given by an active interval, for example every five minutes. Administrators 14*a* select the active interval to suit the acceptable latency of updates to monitor server 40. A shorter active interval decreases the average delay between the time transaction agent 24 has a piece of information ready to send and the time the information is actually sent. However, over time, a shorter active interval also increases the average number of communications from transaction agent 24 to monitor server 40 over the network.

Transaction agent 24 can be inactive. This inactivity can be a deliberate choice of network administrators. For example, an administrator can install transaction agents 24 on a first number of client devices 30 and only activate the transaction agents 24 on a fraction of the client devices 30. Such a strategy conserves computing resources of monitor server 40, or could conserve the number of software licenses that must be purchased if transaction agent 24 is a commercial product. Alternatively, the inactivity of transaction agent 24 can be accidental, perhaps due to a software problem or a hardware failure.

Figure 20A:
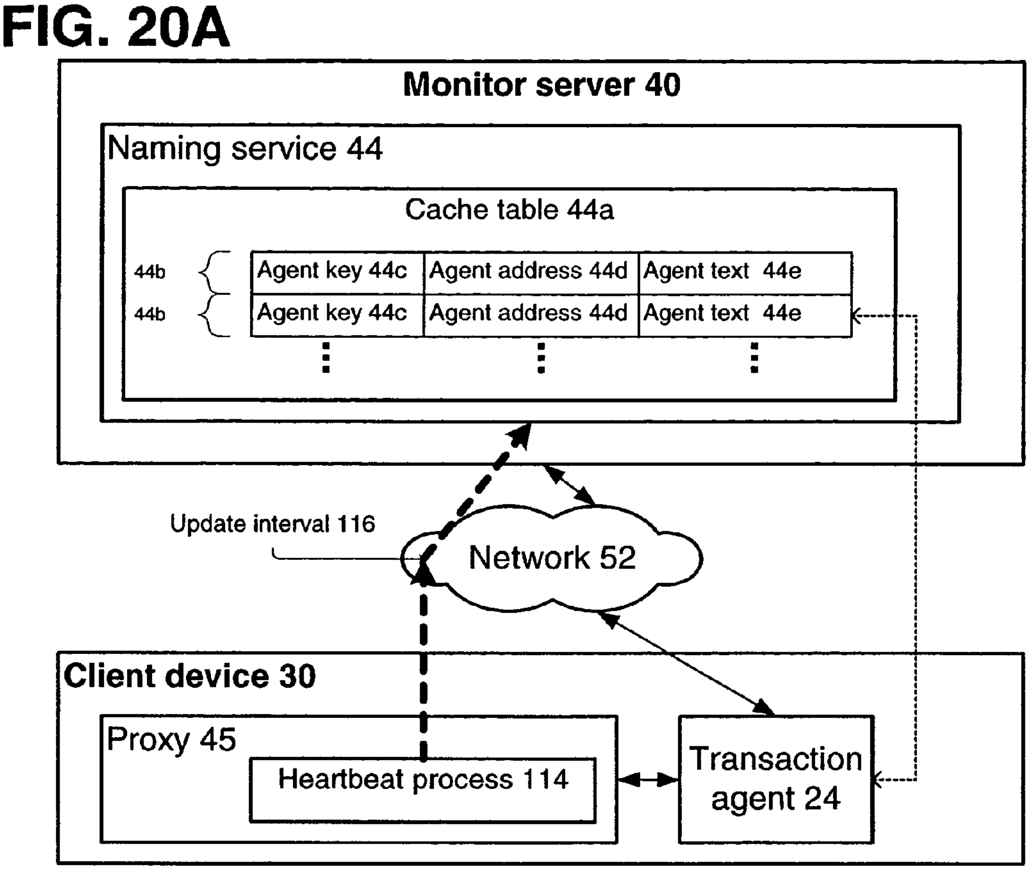
FIG. 20A is a block diagram of a proxy and a naming service.

Referring to FIG. 20A, broadly, for a given transaction agent 24 that uses a logical network address of client device 30, a proxy 45 includes a heartbeat process 114 which repeatedly sends messages to a naming service 44 of monitor server 40, describing the current logical network address of transaction agent 24. As will be explained in more detail, proxy 45 sends the messages at intervals 116 whose length depends on the state of transaction agent 24. Intervals 116 include an active interval 116*a* (FIG. 20B) and an inactive interval 116*b*.

Naming service 44 has a cache table 44*a* in which it maintains a latest logical network address for transaction agent 24. Naming service 44 updates cache table 44*a* based on the messages sent from proxies 45. In particular, for each transaction agent 24, naming service 44 maintains a cache entry 44*b*. Each cache entry 44*b* includes an agent key 44*c* that uniquely identifies cache entry 44*b* within cache table 44*a*; an agent address 44*d* that stores the last logical network address known to the monitor server for the transaction agent 24; and an agent status 44*e*, which stores information about the last transmission received from the transaction agent 24, such as the time of transmission and the interval 116 that was in effect. Naming service 44 periodically checks the status of cache entries 44*b*. Naming service 44 can purge a cache entry 44*b*, for example after detecting that a sufficiently long time period has elapsed without communication from transaction agent 24 or corresponding proxy 45.

Figure 20B:
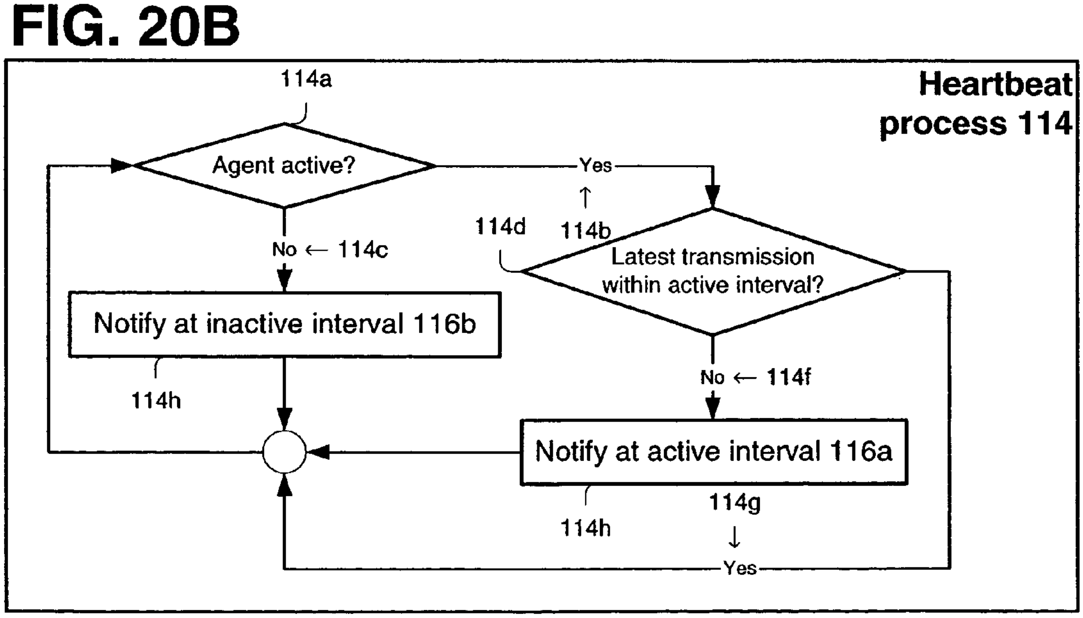
FIG. 20B is a flowchart of a heartbeat process.

Referring to FIG. 20B, at client device 30 running transaction agent 24 and proxy 45, heartbeat process 114 tests whether transaction agent 24 is active (step 114*a*). If so (result 114*b*), heartbeat process 114 tests whether a latest transmission occurred within an active interval 116*a*, among transmissions informing monitor server 40 of the logical network address for transaction agent 24. By default, active interval 116*a* is 5 minutes. In general, transmissions such as batches of transaction event objects 38 from transaction agent 24 or proxy 45 to monitor server 40 include the logical network address for transaction agent 24. That is, batch transmissions perform at least two functions, reporting transactions as well as reporting the logical network address. Proxy 45 monitors such transmissions to monitor server 40, ensuring that the current operative interval 116 between transmission is not exceeded.

If a time period greater than or equal to active interval 116*a* has elapsed without sending a transmission of the logical network address to monitor server 40 (result 114*f*), heartbeat process 114 sends a message to naming service 44, describing the current logical network address (step 114*h*). Otherwise (result 114*g*), heartbeat process 114 loops back to step 114*a*, repeating indefinitely.

If the transaction agent 24 that corresponds to proxy 45 is inactive (result 114*c*), heartbeat process 114 sends a message to naming service 44, describing the current logical network address, approximately at an inactive interval 116*b* (step 114*e*). Here too, heartbeat process 114 loops back to step 114*a*, repeating indefinitely.

By default, inactive interval 116*b* is six hours. Administrators 14*a* can change the values of active interval 116*a* and inactive interval 116*b*. Typically, however, inactive interval 116*b* is greater than active interval 116*a*, so that the overall rate of messages from proxy 45 is lower when transaction agent 24 is inactive.

Proxy 45 is installed on client device 30 such that proxy 45 runs automatically as part of the boot procedure of client device 30. Thus, as client machine powers up after a shutdown, proxy 45 activates heartbeat process 114. Similarly, proxy 45 also runs if client device 30 reboots. In general, proxy 45 is active whenever client device 30 is operational, regardless of the status of transaction agent 24.

Monitor server 40 has a static logical network address. Proxy 45 and transaction agent 24 are given this address as a parameter during installation and store it persistently on client device 30.

Pathset Aggregation

Monitoring system 40 provides data to analytical software (not shown) that detects alarm conditions for a network service or application by generating baseline statistical profiles of the service, then raising alarms when measured performance deviates from the profiles. The analytical software operates in approximately real-time, for example, with delays of zero to 5, 10, or 20 minutes. Such short time frames are important to administrators 14*a*, for instance, who often have professional responsibility for the operation of the service, application, or underlying network. One challenge to the performance of such systems is that they require a statistically significant amount of data to occur within the window of detection time, in order that the deviation can be predicted with good statistical confidence. If the sample is too sparse, statistical models fail. What is more, the window of detection time often cannot be enlarged enough to compensate for sparse sample streams while still offering real-time or near-real-time alarms.

Data streams from events driven by individual human users can be sparse. As a particular user 14 interacts with a client device, engaging in operations that generate transactions to be sent to monitor server 40, the average rate of transactions performed can be quite variable. For example, activity rates can depend upon the user, the type of transaction, and contextual factors such as the time of day. A given client device may go through periods of idleness for several minutes, hours, or even days if the user is away. By the time a single user generates enough activity to characterize a problem condition, the problem may be several hours hold. Also, intermittent problems, such as network traffic blockages, might occur and disappear so rapidly that the detection window on a sparse data stream would not detect them.

Figure 21A:
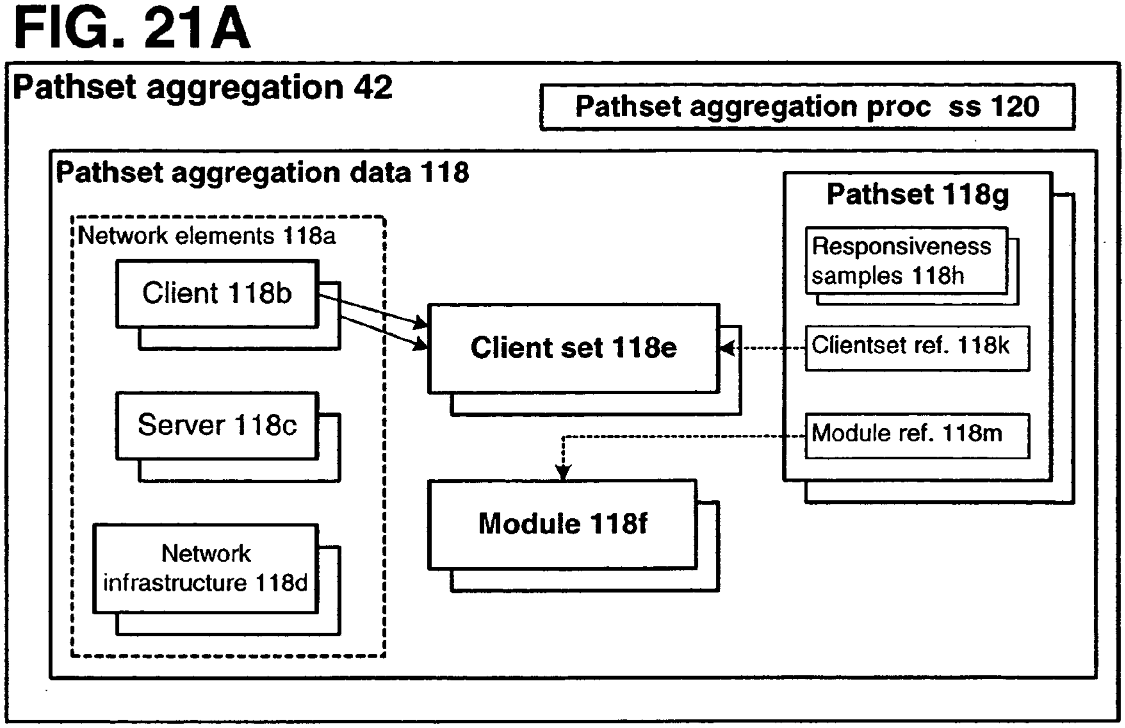
FIG. 21A is a block diagram of a pathset aggregation facility.

Referring to FIG. 21A, pathset aggregation 42 includes pathset aggregation data 118 and pathset aggregation process 120. Pathset aggregation data 118 is a database of information about the network environment in which monitor server 40 monitors application response. The database stores information about network elements 118*a*, including clients 118*b*, servers 118*c*, and network infrastructure elements 118*d* such as switches and routers. A client record 118*b* represents both a client device 30 and its sessions 26. A server record 118*c* represents network services 56 such as web server 56*a* or application server 56*b* (FIG. 2A).

Pathset aggregation data 118 also stores client sets 118*e*, which are collections of clients, for instance grouped by physical proximity or by function. Thus, a client set could represent a collection of client devices 30 at a branch office, or all the client devices 30 in a marketing department of a corporation. Client sets are customizable. Administrators 14*a* define their semantic meaning and associate each client record 118*b* with a client set 118*e*.

Pathset aggregation data 118 also keeps module records 118*f* that describe predetermined types of activities between clients and servers over the network. For instance, one module record 118*f* could specify email traffic, while another specifies DNS services and a third specifies a database application. Module records 118*f* correspond to values referenced by the "module" portion of transaction statement 20*c* (FIG. 7). Module records 118*f* can thus describe several type of applications.

In addition, pathset aggregation data 118 stores pathset records 118*g*. A pathset record 118*g* collects aggregate responsiveness data based on a client set and a module. In particular, a pathset record 118*g* includes a collection of responsiveness samples 118*h*; a client set reference 118*k* that specifies a client set 118*e*; and a module reference 118*m* that specifies a module record 118*f*. The responsiveness samples 118*h* collect response data from transaction event objects 38.

Figure 21B:
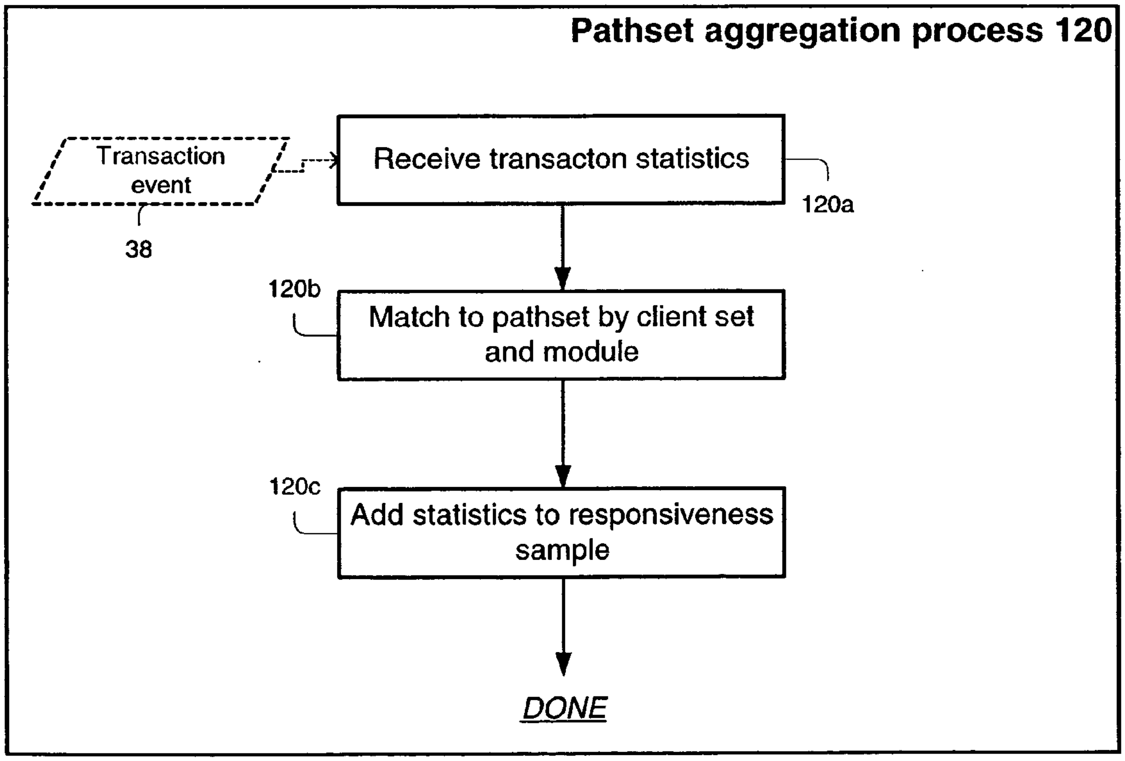
FIG. 21B is a flowchart of a pathset aggregation process.

Referring to FIG. 21B, a pathset aggregation process 120 receives a transaction event object 38 (step 120*a*). Pathset aggregation process 120 retrieves client and module information from transaction event object 38 and finds a matching pathset record 118*g* in pathset aggregation data 118 (step 120*b*). Pathset aggregation process 120 adds transaction statistics from transaction event object 38 to responsiveness samples 118*h* of the pathset record (step 120*c*).

Periodically, monitor server 40 passes responsiveness samples 118*h* of the pathset records 118*g* to the analytical software for reporting and alarming, for example by writing a file out to shared storage and by sending a message to the analytical software that the file is available for retrieval. The aggregation of transaction statistics according to client set and module provides a sample for a statistical baseline profile of service to clients—in particular, to clients in the client set that consume services of the type described by the module. Moreover, the aggregate data stream for multiple clients is less sparse than the data streams for the clients individually, allowing more rapid detection of deviations from the profile.

Devices

Referring to FIG. 2A, standalone device 48 includes a processor 48*a* that operates on data stored in memory 48*b* and executes machine-readable instructions stored in storage 48*e*. Standalone device 48 renders visual information on a display device 48*c* and receives input from users via one or more input devices 48*d*, such as a mouse and keyboard. Storage 48*e* includes an operating system that uses a point-and-click GUI. Network interface 48*f* connects standalone device 48 to network 52. Bus 48*g* carries information between components of standalone device 48. Similarly, components of monitor server device 50, terminal server device 58, and transaction server device 62 are comparable in general structure and function to their like-named counterparts in standalone device 48.

It should be understood that the above-described functionality is implemented on one or more digital processors programmed appropriately. These one or more digital processors have whatever input and output interfaces and devices are required to implement the described functionality (including keyboards, display units, modems, cable interfaces) and they include data storage, both internal and external, for storing the program and the data that are discussed herein.

Also a number of embodiments of the invention have been described. Nevertheless, it will be understood that various modifications may be made without departing from the spirit and scope of the invention. For example, in described embodiments, operating system 13 is a member of Microsoft's Windows family, for example Windows 98. In alternative embodiments, operating system 13 could belong to another operating system family, for example Macintosh or Unix, including Linux. Furthermore, client device 30 could be a device other than a traditional personal computer, for example a handheld device or cell phone, with a correspondingly adapted operating system 13. Accordingly, other embodiments are within the scope of the following claims.

What is claimed is:

1. A computer-based method of formatting rules for monitoring application responsiveness, the method comprising:

defining a collection of resources, each such resource being a source of application events; and defining a first transaction as a timeframe for measuring application responsiveness, the first transaction including a pattern of application events from resources in the collection of resources, the pattern defined as a block of constructs, wherein each construct in the block of constructs is selected from a group of construct syntaxes consisting of an event construct syntax, a choice construct syntax, a sequence construct syntax, and a last construct syntax, wherein:

the event construct syntax specifies a category of application events for the pattern to accept;

the choice construct syntax specifies an option set of constructs from the group of construct syntaxes, any one of which is acceptable to the pattern;

the sequence construct syntax specifies a sequence of constructs from the group of construct syntaxes, for the pattern to accept sequentially; and the last construct syntax specifies a final set of constructs from the group of construct syntaxes, such that the final set of constructs must be satisfied for the pattern to be matched.

2. The method of claim 1, wherein defining the first transaction includes associating the transaction with a module of one or more transactions.

3. The method of claim 1, further comprising defining a second transaction based on the collection of resources.

4. A computer-based method of monitoring networked application responsiveness, the method comprising:

detecting an application instance that has a stream of application events;

instantiating a finite state machine to recognize transactions in the stream of application events for the application instance, the finite state machine including a collection of states and a collection of transitions, each such transition having criteria for events that qualify to transition between a source state for the transition and a destination state for the transition, the source state and the destination state being among the collection of states;

associating a first token with an initial state in the collection of states;

processing the stream of application events sequentially, including, for each such event, comparing the event to a processed transition in the collection of transitions and associating an event token with the destination state of the processed transition if the event satisfies the criteria of the processed transition; and recognizing a transaction if a final state in the collection of states is associated with the event token for a candidate event in the stream of application events.

5. A computer-based method of monitoring networked application responsiveness, the method comprising:

receiving a message that specifies a measure of responsiveness, a client, a server, and a networked service;

selecting from a database a path corresponding to the client and the server, and a client set corresponding to the client; and adding the measure of responsiveness to an aggregate measure of responsiveness for a plurality of clients, the aggregate measure of responsiveness selected according to the client set, the path, and the networked service.

6. The method of claim 5, further comprising:

formulating a predicted responsiveness profile based on the aggregate measure of responsiveness; and if the measure of responsiveness deviates from the predicted responsiveness profile by an amount given by a predetermined formula, creating an alert condition for the deviation.

7. A computer-based method of identifying user interface objects in a windowing environment, the method comprising:

constructing a collection of string descriptions of window properties, including generating a base string description for a base window having an ancestry hierarchy of parent windows, and recursively generating subsequent string descriptions of the parent windows by following the ancestry hierarchy;

calculating a hash of the collection of string descriptions;

identifying the base window with an object identifier that combines an application name for an application associated with the base window, a numeric length of the collection of string descriptions, and the hash.

8. The method of claim 7, wherein the object identifier includes string separators separating the application name, the numeric length, and the hash.

9. A computer-based method of monitoring networked application responsiveness, the method comprising:

receiving a message that specifies a responsiveness measure, a client, a server, and a networked service;

selecting from a database a path corresponding to the client and the server, and a client set corresponding to the client; and adding the responsiveness measure to an aggregate sample of a plurality of clients, the aggregate sample selected according to the set, the path, and the networked service.

10. The method of claim 9, further comprising:

formulating a predicted responsiveness profile based on the aggregate sample; and if the responsiveness measure deviates from the predicted responsiveness profile by an amount given by a predetermined formula, creating an alert condition for the deviation.

* * * * *